(12) United States Patent
Yang et al.

(10) Patent No.: US 11,312,004 B2
(45) Date of Patent: Apr. 26, 2022

(54) GUIDE ROBOT

(71) Applicant: LG ELECTRONICS INC., Seoul (KR)

(72) Inventors: Sunho Yang, Seoul (KR); Haemin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 16/539,867

(22) Filed: Aug. 13, 2019

(65) Prior Publication Data

US 2019/0366532 A1 Dec. 5, 2019

Related U.S. Application Data

(62) Division of application No. 15/853,409, filed on Dec. 22, 2017, now Pat. No. 10,759,045.

(30) Foreign Application Priority Data

Dec. 23, 2016 (KR) .................. 10-2016-0178425
Jul. 5, 2017 (KR) .................. 10-2017-0085368

(51) Int. Cl.
  *B25J 5/00* (2006.01)
  *B25J 9/00* (2006.01)
  (Continued)

(52) U.S. Cl.
  CPC ............. *B25J 9/0009* (2013.01); *B25J 5/007* (2013.01); *B25J 9/0003* (2013.01); *B25J 9/1694* (2013.01);
  (Continued)

(58) Field of Classification Search
  CPC . B25J 9/1694; B25J 9/009; B25J 5/007; B25J 9/0003; B60P 1/26; G09F 2013/0481
  (Continued)

(56) References Cited

U.S. PATENT DOCUMENTS 6,920,376 B2 7/2005 Jouppi
7,164,969 B2 1/2007 Wang
(Continued)

FOREIGN PATENT DOCUMENTS

CN 105034002 11/2015
EP 1 932 632 6/2008
(Continued)

OTHER PUBLICATIONS

Zhang et al., A networked teleoperation system for mobile robot with wireless serial communication, 2009, IEEE, p. 2227-2231 (Year: 2009).

(Continued)

*Primary Examiner* — Randell J Krug
(74) *Attorney, Agent, or Firm* — Ked & Associates LLP

(57) ABSTRACT

The guide robot includes a case having a coupling hole and a door type display structure that is capable of opening or closing the coupling hole. Access to the body part in which main electrical components are provided may be easy. An installation plate coupled to a main frame, a slide guide and a guide plate, which are coupled to the installation plate, and a plurality of link type coupling devices coupled to one side of the guide plate and connected to the display unit may be provided to open or close the coupling hole by rotating the display unit after the display unit slidably moves.

17 Claims, 21 Drawing Sheets

(51) Int. Cl.
*B25J 11/00* (2006.01)
*B25J 19/00* (2006.01)
*B25J 9/16* (2006.01)
*B25J 19/02* (2006.01)

(52) U.S. Cl.
CPC ............. *B25J 11/008* (2013.01); *B25J 19/00* (2013.01); *B25J 19/023* (2013.01)

(58) Field of Classification Search
USPC .................... 348/838–839; 16/366, 368–370
See application file for complete search history.

(56) References Cited

U.S. PATENT DOCUMENTS

| | | | |
|---|---|---|---|
| 7,171,286 | B2 | 1/2007 | Wang |
| 8,265,793 | B2 | 9/2012 | Cross |
| 9,489,490 | B1 * | 11/2016 | Theobald ................ B25J 5/007 |
| 9,720,414 | B1 | 8/2017 | Theobald |
| 2003/0028993 | A1 | 2/2003 | Song |
| 2005/0171636 | A1 | 8/2005 | Tani |
| 2005/0219356 | A1 | 10/2005 | Smith et al. |
| 2005/0277477 | A1 * | 12/2005 | Hajder ................ G07F 17/3216 463/46 |
| 2007/0143187 | A1 | 6/2007 | Gottfurcht |
| 2007/0150094 | A1 | 6/2007 | Huang |
| 2007/0192910 | A1 | 8/2007 | Vu et al. |
| 2008/0154488 | A1 | 6/2008 | Silva et al. |
| 2009/0173561 | A1 | 7/2009 | Moriguchi et al. |
| 2010/0094459 | A1 | 4/2010 | Cho et al. |
| 2010/0180709 | A1 | 7/2010 | Choi et al. |
| 2013/0221101 | A1 | 8/2013 | Lebaschi et al. |
| 2015/0148951 | A1 | 5/2015 | Jeon et al. |
| 2016/0171303 | A1 | 6/2016 | Moore et al. |
| 2017/0011258 | A1 | 1/2017 | Pitre et al. |
| 2017/0075962 | A1 | 3/2017 | Hitchcock et al. |
| 2017/0106738 | A1 * | 4/2017 | Gillett ................ A63C 17/014 |
| 2017/0129602 | A1 | 5/2017 | Alduaiji et al. |
| 2017/0221130 | A1 | 8/2017 | Kraus et al. |
| 2018/0009108 | A1 | 1/2018 | Yamamoto et al. |
| 2018/0178375 | A1 | 6/2018 | Yang |
| 2018/0178377 | A1 | 6/2018 | Yang |
| 2018/0192845 | A1 | 7/2018 | Gu |
| 2019/0005545 | A1 | 1/2019 | Roh |
| 2019/0107833 | A1 | 4/2019 | Song et al. |

FOREIGN PATENT DOCUMENTS

| | | |
|---|---|---|
| EP | 2 025 478 | 2/2009 |
| JP | 2002-355779 | 12/2002 |
| JP | 2004-017200 | 1/2004 |
| JP | 2005-172879 | 6/2005 |
| JP | 2007-229817 | 9/2007 |
| JP | 2017-097207 | 6/2017 |
| KR | 10-0916493 | 9/2009 |
| KR | 10-2009-0128637 | 12/2009 |
| KR | 10-2010-0006975 | 1/2010 |
| KR | 10-2012-0111519 | 10/2012 |
| KR | 10-1193610 | 10/2012 |
| KR | 10-1243262 | 3/2013 |
| KR | 20-0481042 | 8/2016 |
| WO | WO 2007/041295 | 4/2007 |
| WO | WO 2016/094013 | 6/2016 |

OTHER PUBLICATIONS

Lemburg et al., AILA—design of an autonomous mobile dual-arm robot, 2011, IEE, p. 5147-5153 (Year: 2011).
Hebert et al., Supervised Remote Robot with Guided Autonomy and Teleoperation (SURROGATE): A framework for whole-body manipulation, 2015, IEEE, p. 5509-5516 (Year: 2015).
Ignatiev et al., Autonomous omni-wheeled mobile robots, 2016, IEEE, p. 1-4 (Year: 2016).
United States Office Action dated Jan. 3, 2020 issued in U.S. Appl. No. 15/853,587.
U.S. Office Action dated Dec. 26, 2019 issued in U.S. Appl. No. 15/936,814.
United States Office Action dated Sep. 13, 2019 issued in U.S. Appl. No. 15/853,409.
U.S. Office Action dated Oct. 7, 2019 issued in U.S. Appl. No. 16/020,579.
United States Office Action dated Mar. 4, 2020 issued in U.S. Appl. No. 16/020,579.
United States Office Action dated Feb. 21, 2020 issued in U.S. Appl. No. 15/853,409.
Minute Explained: "R2-D2's Tools Explained! The Ultimate Intergalactic Swiss Army Knife"; https://www.youtube.com/watch?v-ejwVwqUV4LA retrieved on May 7, 2018 (XP-054978324).
European Search Report dated May 17, 2018 issued in Application No. 17209452.6.
European Search Report dated May 18, 2018 issued in Application No. 17209458.3.
European Search Report dated May 23, 2018 issued in Application No. 17209459.1.
European Search Report dated Sep. 7, 2018 issued in EP Application No. 18164322.2.
European Search Report dated Nov. 16, 2018 issued in Application No. 18177444.9.
Korean Office Action dated Dec. 6, 2018 issued in KR Application No. 10-2017-0085353.
Korean Office Action dated Dec. 7, 2018 issued in KR Application No. 10-2017-0085368.
U.S. Office Action dated Apr. 19, 2019 issued in co-pending related U.S. Appl. No. 16/020,579.
U.S. Appl. No. 16/539,867, filed Aug. 13, 2019.
U.S. Appl. No. 15/853,409, filed Dec. 22, 2017.
U.S. Appl. No. 15/853,533, filed Dec. 22, 2017.
U.S. Appl. No. 15/853,587, filed Dec. 22, 2017.
U.S. Appl. No. 15/936,814, filed Mar. 27, 2018.
U.S. Appl. No. 16/020,579, filed Jun. 27, 2018.

* cited by examiner

GUIDE ROBOT

CROSS-REFERENCE TO RELATED APPLICATIONS

This application is a Divisional of U.S. application Ser. No. 15/853,409, filed Dec. 22, 2017, which claims priority under 35 U.S.C. § 119 to Korean Patent Application No. 10-2017-0085368, filed on Jul. 5, 2017, and Korean Patent Application No. 10-2016-0178425, filed on Dec. 23, 2016, whose entire disclosures are hereby incorporated by reference.

BACKGROUND

1. Field

The present disclosure relates to a guide robot.

2. Background

The application fields of robots are generally classified into industrial, medical, space, and submarine applications. For example, in the mechanical processing industrial such as automobile production, robot may perform repetitive works. Industrial robots are used in which simple labor is required to repeat the same operation. Such a robot may confirm a position or recognize an obstacle by using a camera. The robot may also display a photographed image on a display.

With the recent increase in airport users and efforts to make a leap into a smart airport, plans are being developed to provide services through robots in airports. When an artificial intelligence robot is introduced to the airport, it may be expected that the robot is capable of performing the unique role of the person who could not replace the existing computer system, thereby contributing to the quantitative and qualitative improvement of the provided services.

In general, a robot includes a screen, e.g., a display unit that provides service information to a user. The display unit may also move to a position that is convenient for the user. For example, the display unit may be mounted on a main body to adjust a height thereof in a vertical direction.

Korean Patent Registration No. 10-1243262 (Registration Date: Mar. 7, 2013) entitled "INTELLIGENT DISPLAY DEVICE," discloses the screen unit mounted on a main body to provide service information to a user and a driving unit for elevating the screen unit. A screen angle may be automatically adjusted to match a viewing angle of the user. The screen unit and the driving unit are coupled to the main body in the form of a rail to ascend and descend.

When repair of the device is required, access to the driving unit for fixing the screen unit or access to the main body connected to the driving unit is difficult. There is an inconvenience that the main electrical units of the main body are opened by releasing the coupling of the screen unit or the coupling of the driving unit.

The screen unit (display) is coupled to the driving unit. When the screen unit is replaced with another display unit or repaired by completely separating the screen unit from the main body, the releasing of the coupling is arduous. Although the screen unit is disassembled, the screen unit has to move to a separate space for repairing the main body and the driving unit. However, it is inconvenient to move of the screen unit due to a heavy weight of the screen unit.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

The guide robot according to an embodiment may provide a route guide service or airport information to a user. A guide robot that is used at an airport will be described as one example for the detailed description. However, such a guide robot may be used anywhere where a guide is needed for a person at home or outside of the home, or other public settings.

Figure 1:
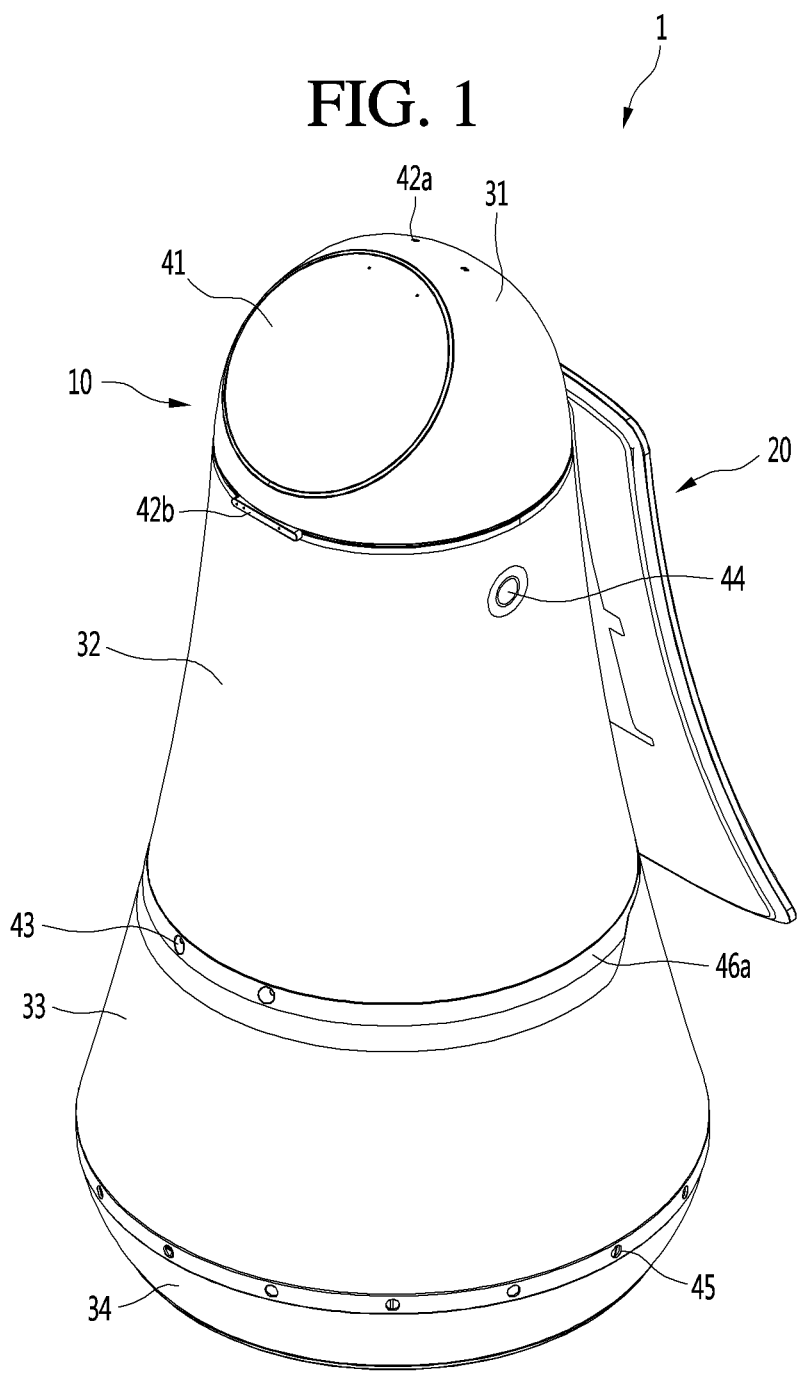
FIG. 1 is a front perspective view illustrating an outer appearance of a guide robot according to an embodiment.
Figure 2:
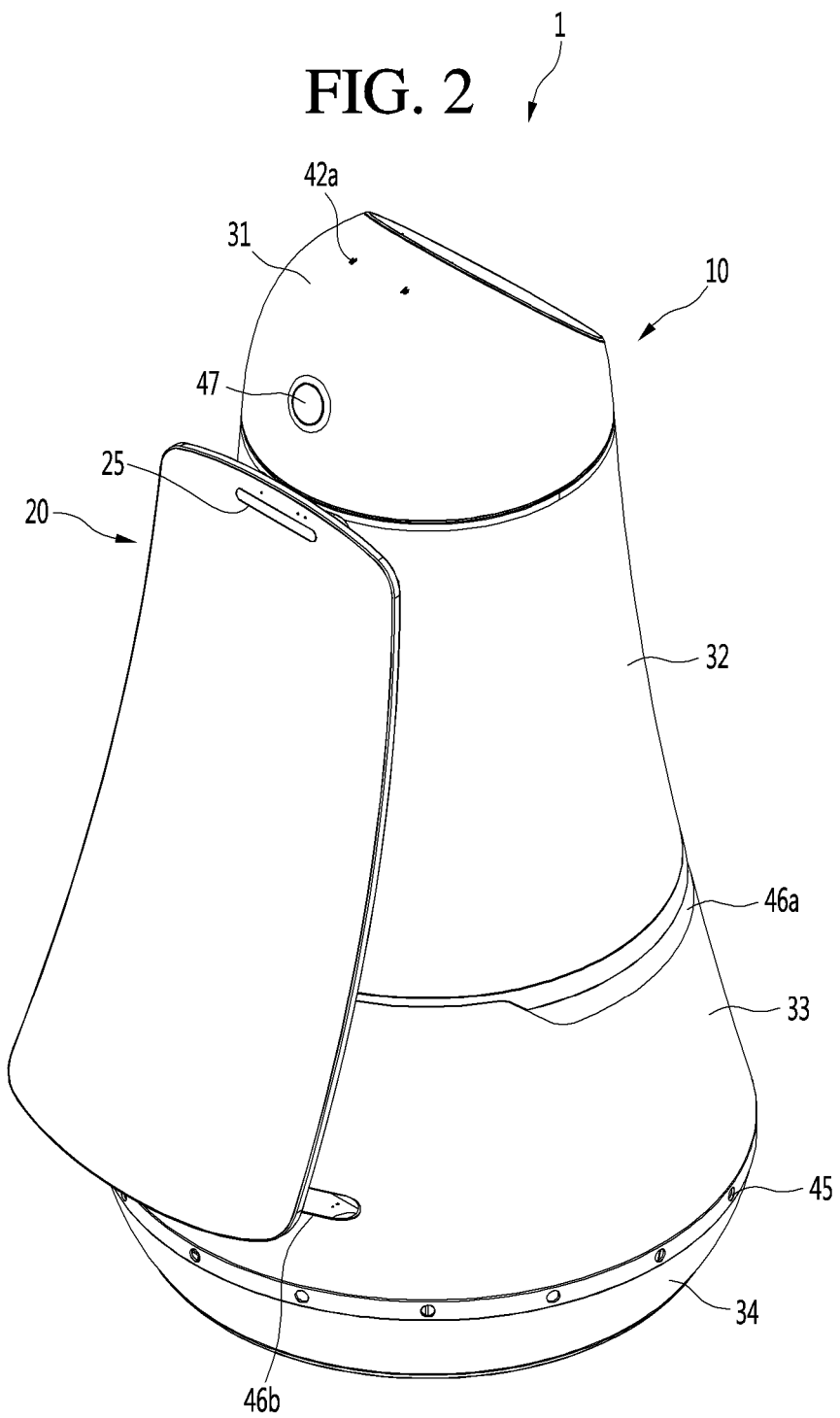
FIG. 2 is a rear perspective view illustrating the outer appearance of the guide robot according to an embodiment.
Figure 3:
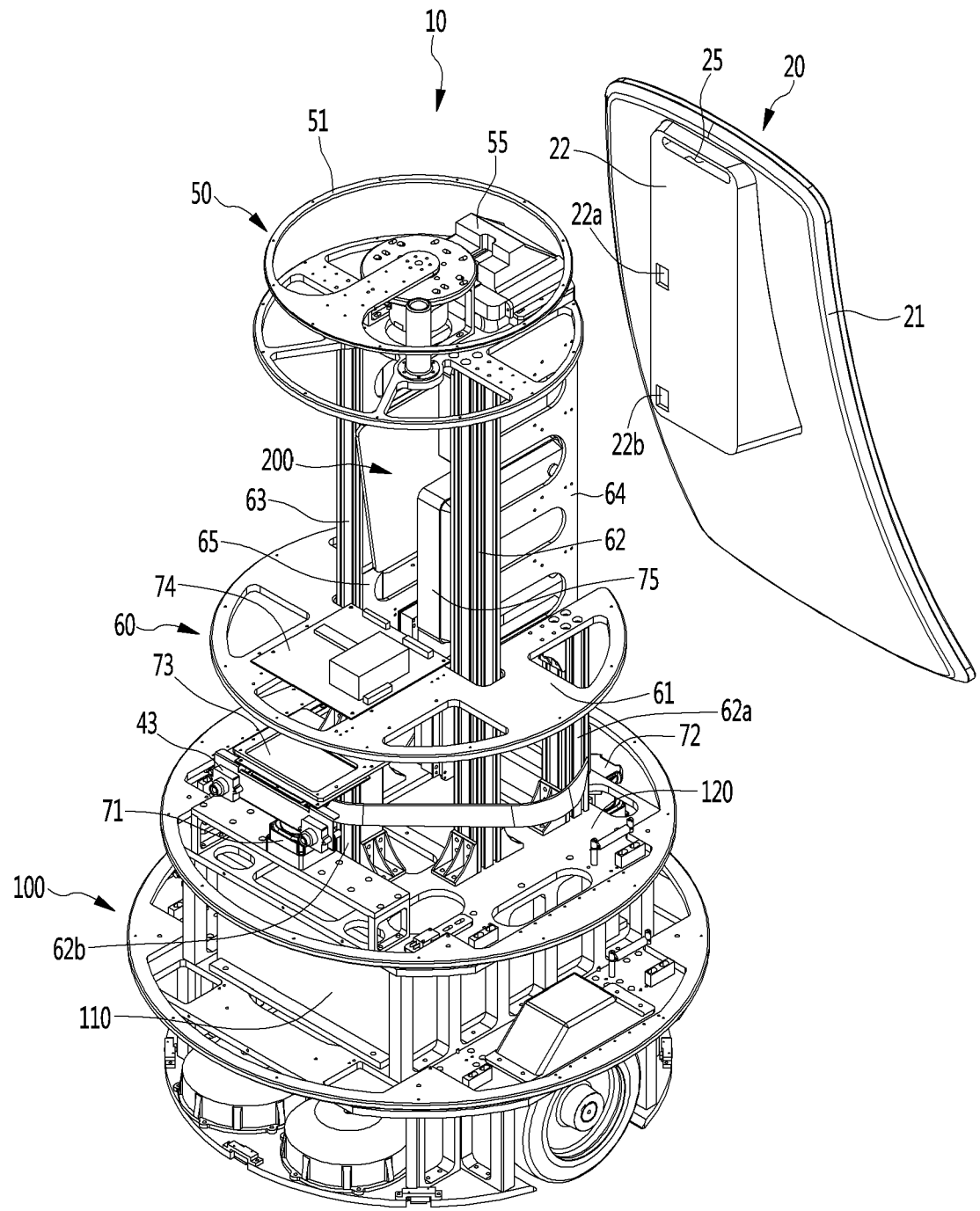
FIG. 3 is a perspective view illustrating an internal configuration in which a case of the guide robot is removed according to an embodiment.

Referring to FIGS. 1 to 3, a guide robot 1 according to an embodiment may include a main body 10 and a display unit or module 20 (or a display screen).

The main body 10 may include cases or shells 31, 32, 33, and 34 defining an outer appearance of the guide robot 1, and the cases 31, 32, 33, and 34 may cover the main body 10. The cases 31, 32, 33, and 34 may include a top cover 31 provided at an upper side, a first middle cover 32 provided below the top cover 31, a second middle cover 33 provided below the first middle cover 32, and a bottom cover 34 provided below the second middle cover 33.

The top cover 31 may be provided at the uppermost end of the guide robot 1 and may have a dome shape. The top cover 31 may be provided at a height (e.g., about 142 cm or 4.65 ft) less than that of an adult to easily receive an input command from the user. The top cover 31 may rotate at an angle of about 360 degrees.

The top cover 31 may include a manipulation part or user interface 41 at a side of a front surface thereof. The manipulation part 41 may perform a function of receiving a command from the user. For this, the manipulation part 41 may include a touch monitor for receiving a touch input from the user.

The manipulation part 41 may further include an object recognition sensor. The object recognition sensor may include a 2D camera and an RGBD sensor. The 2D camera may be a senor for recognizing a person or object on the basis of a two-dimensional image. The RGBD sensor (red, green, blue, and distance sensors) may be a sensor for acquiring a person's position or face image. The manipulation part 41 may further include at least one physical button or push button for directly receiving a command from the user.

The top cover 31 may further include a microphone 42a provided on an upper portion of the manipulation part 41. The microphone 42a may perform a function of receiving an audio command from the user. For example, the microphone 42a may be provided at each of four spots on the upper end of the top cover 31 to accurately receive a sound command from the user. Even if the guide robot 1 is stopped as well as traveling, an acoustic route guide request may be accurately received from the user.

In this embodiment, the top cover 31 may rotate to allow the manipulation part 41 to face a direction of travel of the guide robot 1. When the guide robot 1 receives a command (e.g., the voice command) from the user while the guide robot 1 is moving, the top cover 31 may rotate to be directed to a direction toward a position of the user.

Alternatively, when the guide robot 1 receives a command from the user while the guide robot 1 is moving, the top cover 31 may rotate in a direction opposite to the travel direction of the guide robot 1. The top cover 31 may rotate in a direction in which the display unit 20 is oriented. Thus, the user may manipulate the manipulation part 41 while the user views the airport information displayed on the display unit 20.

The top cover 31 may further include an emergency manipulation button 47, either a push button or touch input button. The emergency manipulation button 47 may perform a function of immediately stopping an operation of the guide robot 1 while the guide robot 1 is stopped or traveling.

The first middle cover 32 is provided below the top cover 31. The first middle cover 32 may have a cylindrical shape where the diameter gradually increases as the distance from the top over increases. Various electrical components including a board may be accommodated in the first middle cover 32.

The RGBD sensor 42b may be provided on an upper portion of the first middle cover 32. The RGBD sensor 42b may perform a function of detecting collision between the guide robot 1 and an obstacle while the guide robot 1 is traveling. For this, the RGBD sensor 42b may be provided in the traveling direction of the guide robot 1, i.e., at a front side of the first middle cover 32. For example, the RGBD sensor 42b may be provided at the uppermost portion of the first middle cover 32 in consideration of an obstacle existing at the front of the guide robot 1 or a height of a person.

The first middle cover 32 may further include a speaker 44. The speaker 44 may perform a function of informing airport-related information to the user by a voice output.

The first middle cover 32 may further include a seating part or support ledge (see reference numeral 32a of FIG. 4) on which the display unit 20 is mounted and a coupling hole (see reference numeral 32b of FIG. 4) provided as an opening that is opened and closed by the display unit 20.

The seating part 32a and the coupling hole 32b may be provided on one surface of a rear portion of the first middle cover 32 on which the display unit 20 is provided. In other words, the seating part 32a and the coupling hole or opening 32b may be provided in a rear portion of the main body 10.

The seating part 32a may have a plate shape so that the display unit 20 is supported thereon. For example, the seating part 32a may support the display unit 20 by supporting a bottom surface of a coupling part 22 of the display unit 20 thereon.

The coupling hole 32b may be provided as an opening that coincides with an outer circumference of the coupling part 22 that will be described later. Thus, the coupling hole 32b may be closed or opened through the coupling part 22.

The coupling hole or access opening 32b may be closed by a closing operation of the display unit 20, such that the display unit 20 and the main body 10 may appear to be integrally coupled to each other. The coupling hole 32b may be accessed by an opening operation of the display unit 20, such that the display unit 20 may be spaced apart from the main body 10.

The guide robot 1 may be easily repaired or maintained through the coupling hole 32b. In detail, a body part 60 (or a circular plate) of the main body 10 is provided in the first middle cover 32, and main electrical components of the guide robot 1 are mainly provided on the body part 60. When the guide robot 1 needs to be cleaned, or repaired, or needs maintenance, the user may easily access the main electrical components through the coupling hole 32b provided in one surface of the rear portion of the first middle cover 32.

The first middle cover 32 may have a camera hole connected to a stereo camera 43. The camera hole may be a hole for an operation of the stereo camera 43 installed in the main body 10. The camera hole may be defined in a front lower end of the first middle cover 32. The stereo camera 43 may photograph a front side of the guide robot 1 through the camera hole.

The second middle cover 33 is provided below the first middle cover 32. The second middle cover 33 may have a cylindrical shape that gradually increases in diameter similar to the first middle cover 32. The second middle cover 33 may include a first cutout part 46a. The first cutout part 46a may be defined in a front surface of the second middle cover 33. The first cutout part 46a may be a portion that is cut in the second middle cover 33 so that a front lidar 71 (e.g., a radar detection system) is operable.

The front lidar 71 is provided in the second middle cover 33. The first cutout part 46a may be defined to be cut along a circumference of the second middle cover 33 at a position corresponding to that of the front lidar 71. The front lidar 71 may be exposed to the outside by the first cutout part 46a.

The second middle cover 33 may further include a second cutout part 46b (see FIG. 2). The second cutout part 46b may be defined in a rear surface of the second middle cover 33. The second cutout part 46b may be a portion that is cut in the second middle cover 33 so that a rear lidar 72 (e.g., a radar detection system) that will be described later is operable. Particularly, the second cutout part 46b may be cut in the rear surface of the second middle cover 33 by a predetermined length in a radius direction.

The rear lidar 72 is provided in the second middle cover 33. The second cutout part 46*b* may be defined to be cut along a circumference of the second middle cover 33 at a position corresponding to that of the rear lidar 72. The rear lidar 72 may be exposed to the outside by the second cutout part 46*b*.

In this embodiment, the first cutout part 46*a* may be vertically spaced apart from the second cutout part 46*b* so that the first cutout part 46*a* is not connected to the second cutout part 46*b*. The first cutout part 46*a* may be provided above the second cutout part 46*b*.

The second middle cover 33 may further include an ultrasonic sensor 45. The ultrasonic sensor 45 may be a sensor for determining a distance between the obstacle and the guide robot 1 by using an ultrasonic signal. The ultrasonic sensor 45 may perform a function of detecting an obstacle that is close to the guide robot 1. For example, the ultrasonic sensor 45 may be provided in plurality to detect an obstacle in all directions, which is close to the guide robot 1. The plurality of ultrasonic sensor 45 may be spaced apart from each other along a circumference of a lower end of the second middle cover 33.

The bottom cover 34 is provided below the second middle cover 33. The bottom cover 34 may have a cylindrical shape that gradually decreases in diameter downward. A main wheel and an auxiliary wheel may be accommodated in the bottom cover 34.

The display unit 20 may be connected to the main body 10 of the guide robot 1 and installed in a prescribed direction of the main body 10. For example, the display unit 20 may be installed on a rear portion of the guide robot 1 and oriented lengthwise in a vertical direction.

The display unit 20 may be installed on one surface of a case, which is opposite to the moving direction of the main body 10 to perform the guide function such as guidance for the user to a boarding gate. The display unit 20 may be a curved display. Visual information (e.g., airport gate information, route guide service information, and the like) related to the service of the guide robot may be provided on the display unit.

The display unit 20 may further include a display cover 21 accommodating the curved display. The curved display may be accommodated in the display cover 21. The display cover 21 may be positioned at a rear side of the first middle cover 32.

The display unit 20 may include the coupling part or display support 22 protruding toward the main body 10. In another aspect, the coupling part 22 may constitute a portion of the case connected to the main body 10. A dimension of the coupling part 22 may correspond to a dimension of the coupling hole 32*b* provided as the opening in a surface of the first middle cover 32 to close the coupling hole 32*b*.

The coupling part 22 (or a display support) may protrude from a surface of the display cover 21. For example, the coupling part 22 may protrude from a surface of the display cover 21 in a direction of the main body 10. The coupling part 22 may protrude from a rear surface of the display cover 21 in a direction of the first middle cover 32.

The coupling part 22 may have various shapes. However, since the coupling part 22 is closely mated to the coupling hole or opening 32*b*, the coupling part 22 may have an outer circumference coinciding with the coupling hole 32*b*.

When the coupling part 22 is viewed from a side thereof, the coupling part 22 may have a front surface mated to the main body 10, which is flat in a direction perpendicular to a bottom surface thereof. The front surface of the coupling part 22 may have a plate shape that stands up.

When the coupling part 22 is viewed from the side thereof, the coupling part 22 may have a rear surface connected to the display cover 21, which is concavely covered. Thus, the rear surface of the coupling part 22 may have a shape corresponding to an outer contour of the display cover 21 accommodating the curved display. As described above, the bottom surface of the coupling part 22 may be seated on the seating part 32*a*.

The display unit 20 may further include a reader hole or slot 25 that is a hole coincides to an internal space of a reader 55. In detail, the reader connection hole 25 may be defined by forming a hole in a front upper portion of the coupling part 22. The reader connection hole 25 may be provided as a hole in an upper portion of each of the coupling part 22 and the display cover 21. The user may insert a plane ticket or a mobile boarding pass into the internal space of the reader 55 through the reader connection hole 25 defined in an upper portion of the display unit 20.

The coupling part 22 may include installation or attachment grooves or recess 22*a* and 22*b* coupled to coupling devices 240 and 250 that will be described later. A movement guide device 200 (or slidable/retractable installation guide) and the display unit 20 may be connected to each other through the installation grooves 22*a* and 22*b*. The installation grooves 22*a* and 22*b* may be coupled and fixed to the coupling device by using a separate coupling member. The installation grooves 22*a* and 22*b* may be defined by recessing the front surface of the coupling part 22.

The installation grooves 22*a* and 22*b* may be provided in plurality. For example, the installation grooves 22*a* and 22*b* may further include a first installation groove 22*a* and a second installation groove 22*b* defined below the first installation groove 22*a*. The first installation groove 22*a* may be coupled to the first coupling device 240 that will be described later, and the second installation groove 22*b* may be coupled to the second coupling device 250 that will be described later.

The display unit 20 may perform an opening or closing operation for opening or closing the coupling hole 32*b* that is the opening of the main body 10. This will be described later in detail. According to an embodiment, the guide robot 1 may move first along a set route to guide the user to the route. The user may see the display unit 20 installed on the rear portion of the guide robot 1 while moving along the guide robot 1. The user may easily see the airport information displayed on the display unit 20 while traveling along the guide robot 1 even though the guide robot 1 is traveling to guide the user.

The display unit 20 may have an upper end extending up to an upper end of the first middle cover 32 and a lower end extending to the second cutout part 46*b*. If the display unit 20 is provided to cover the second cutout part 46*b*, laser emitted from the rear lidar 72 may collide with the lower end of the curved display. It may be difficult to detect a distance between the guide robot 1 and the obstacle provided at the rear side of the guide robot 1.

The direction will be defined. In FIG. 3, a vertical direction may be referred to as an upward and downward direction or an axial direction, and a horizontal direction may be referred to as a radial direction. The axial direction may be a direction of a central axis of a traveling part 100 and be the same as a direction of a central axis of a head part 50. The radial direction may be understood as a direction perpendicular to the axial direction. A direction of a virtual circle defined when rotating about the axial direction by using a distance of the radial direction as a rotation radius may be called a circumferential direction. Also, a direction in which the stereo camera 43 is oriented may be called a front direction, and a direction in which the display unit 20 is oriented may be called a rear direction.

The main body 10 according to an embodiment may include the traveling part 100 (e.g., lower section) capable of traveling, a body part 60 (e.g., middle section) provided above the traveling part 100 to include main electronic equipment, and the head part 50 (e.g., upper section) provided above the body part 60.

The traveling part 100 may include a traveling wheel including a main wheel connected to a motor and an auxiliary wheel that is subordinated to the main wheel and a bumper stacked on the traveling wheel. The traveling part 100 may further include a support plate 120 supporting a plurality of frames 62 and 63. The support plate 120 may have a disk shape and be coupled to a plurality of brackets for fixing and supporting the plurality of frames 62 and 63.

The traveling part 100 may further include the rear lidar 72 and a battery 110 providing power. The battery 110 may supply power for driving the guide robot 1. Since the battery occupies the largest weight of the entire weight of the guide robot 1, the battery 110 may be provided at a lower portion of the main body 10. The battery 110 may include a Li-ion battery. However, the present disclosure is not limited thereto. The battery 110 may include a battery different from the Li-ion battery.

The rear lidar 72 may be a laser sensor, i.e., a sensor that irradiates laser beams and collects analyzes light, which is scattered backward, of light absorbed or scattered by aerosol to recognize a position of the obstacle. The rear lidar 72 may be provided at a rear side of a guide plate 310 that will be described later. The rear lidar 72 may be provided to face the rear side of the guide robot 1. The rear lidar 72 may be exposed to the outside through the second cutout part 46*b* defined in the second middle cover 33.

The body part 60 may be provided above the traveling part 100 and include the plurality of frames 62 and 63. The plurality of frames 62 and 63 may be fixed and supported by the support plate 120 and lengthily extend upward.

The plurality of frames 62 and 63 may include main frames 62 and 63 extending from the support plate 120 to the head part 50. The main frames 62 and 63 may support the display unit 20 and the head part 50. The main frames 62 and 63 may include a first main frame 62 and a second main frame 63. In detail, each of the first and second main frames 62 and 63 may have a pillar shape to extend axially in a vertical direction. The first and second main frames 62 and 6 may be fixed to a top surface of the support plate 120.

The first and second main frames 62 and 63 may be spaced the same distance from a center of the support plate 120 in both directions. In another aspect, the first and second main frames 62 and 63 may be bilaterally symmetrical to each other with respect to the center of the support plate 120. The head part 50 may be coupled to an upper end of each of the first and second main frames 62 and 63.

The body part 60 may further include a body plate 61. The main frames 62 and 63 may pass through the body plate 61 and then be inserted into any positions of the main frames 62 and 63. The body plate 61 may be provided at a lower side of a bisector with respect to a point that bisects each of the main frames 62 and 63. The body plate 61 may have a disk shape and also have openings to minimize a weight thereof.

The body part 60 may include various boards (substrates) for controlling an overall operation of the guide robot 1. Core electronic equipment of the guide robot 1 may be provided on the body part 60.

The body part 60 may include an application processor (AP) board 74. The AP board may be provided on a top surface of the body plate 61. The AP board may function as a device for managing the entire system of a hardware module of the guide robot 1, i.e., a controller.

The plurality of frames may further include sub frames. The sub frames may be provided below the body plate 61 to perform a function of supporting the body plate 61. The plurality of sub frames may be provided lower than the main frames 62 and 63. Particularly, the sub frames may include a first sub frame 62*a* and a second sub frame 62*b* (not visible in FIG. 3).

Each of the first and second sub frames may have a pillar shape to extend in the vertical direction. The first and second sub frames may be fixed to the top surface of the support plate 120.

The first and second sub frames may be spaced the same interval backward from the first and second main frames 62 and 63, respectively and be provided lower than the body plate 61. That is, the first and second sub frames may be bilaterally symmetrical with respect to a center of the support plate 120. Also, the body plate 61 may be coupled to upper ends of the first and second sub frames.

The frames may further include a third sub frame 62*b*. The third sub frame may be fixed to the top surface of the support plate 120. The third sub frame may be provided adjacent to the main frame. For example, the third sub frame may be spaced a predetermined distance forward from the center of the support plate 120. The third sub frame may be provided on a front portion of the support plate 120 in consideration of a center of gravity of the body plate 61. The body plate 61 may be coupled to an upper end of the third sub frame.

The body part 60 may further include installation plates 64 and 65. Each of the installation plates 64 and 65 may have a plate shape to extend axially in the vertical direction, and the installation plates 64 and 65 may be coupled to the main frames 62 and 63, respectively.

The installation plates 64 and 65 may include a first installation plate 64 and a second installation plate 65. For example, the first installation plate 64 may be coupled to the first main frame 62, and the second installation plate 65 may be coupled to the main frame 63.

The first installation plate 64 and the second installation plate 65 may be provided to face each other. Each of the surfaces on which the first and second installation plates 64 and 65 face each other may be referred to as an inner surface. The first main frame 62 may be coupled to an outer surface of the first installation plate 64, and the second main frame 63 may be coupled to an outer surface of the second installation plate 65.

The first installation plate 64 may extend downward from an upper end of the first main frame 62. Also, the second installation plate 65 may extend downward from an upper end of the second main frame 63.

A lower portion of each of the first and second installation plates 64 and 65 may pass through the body plate 61. Also, each of the first and second installation plates 64 and 65 may have a plurality of openings to reduce a weight thereof.

The body part 60 may further include a micro controller unit (MCU) board. The MCU board may be provided on the inner surface of the first installation plate 64. The MCU board may control an overall operation of the guide robot 1 and include a memory in which data for supporting various functions of the guide robot 1 is stored.

The body part 60 may further include a power board 75. The power board 75 may be provided on the inner surface of the first installation plate 64. The power board may control the supply of power of the battery 110 to various components provided in the guide robot 1.

The body part 60 may further include a user interface board. The user interface board may be provided on the inner surface of the first installation plate 64. The user interface board may control an operation of a component that is responsible for a user to provide an input and provide an output.

The body part 60 may further include a main PCB or a stereo board 73. The main PCB or the stereo board 73 may be provided below the body plate 61 and provided between the stereo camera 43 and the third sub frame. The stereo board may be responsible for a data management for processing sensed data collected from the various sensors and the camera to recognize a position of the guide robot 1 and an obstacle.

In this embodiment, the number of various boards (substrates) is not limited thereto, and thus may be smaller or larger than the above numbers. Since the kinds of above-described boards are merely examples, the present disclosure is not limited to the kind of boards.

The body part 13 may further include the front lidar 71. The front lidar 71 may be a laser radar, i.e., a sensor that irradiates laser beams, collects, and analyzes light, which is scattered backward, of light absorbed or scattered by aerosol to recognize a position of the obstacle. The front lidar 71 may have the same component as the rear lidar 72. However, the front lidar 71 may be provided at a front side of the second support plate 120. The front lidar 71 may be provided to face a front side of the guide robot 1. The front lidar 71 may be exposed to the outside through the first cutout part 46a defined in the second middle cover 33.

The body part 13 may further include the stereo camera 43. The stereo camera 43 may perform a function of detecting an obstacle provided at the front side of the guide robot 1 together with the RGBD sensor 42b.

The body part 60 may further include the movement guide device 200 that moves the display unit 20 forward or backward through a sliding movement. The movement guide device 200 may be coupled to the second installation plate 65. This will be described later in detail.

The head part 50 may be rotatably installed above the body part 60. The head part 50 may be coupled to the top cover 31, and the top cover 31 may be installed to be rotatable with the head part 50. The head part 50 may further include a rotation motor. The rotation motor may provide power for rotating a rotation member 51.

The head part 50 may further the reader 55. The reader 55 may have an opening aligned with the coupling hole 32b. The internal space of the reader 55 may be defined above the coupling hole 32b. Thus, the reader 55 may be aligned to the reader connection hole 25 of the coupling part 22.

When the display unit 20 is in the closed state to close the coupling hole 32b, the reader connection hole 25 and the internal space of the reader 55 may be aligned to each other. The user may insert a plane ticket into the reader 55 through the reader connection hole 25.

The reader 55 may scan or recognize a user's passport, a plane ticket, a mobile barcode, a QR code and the like. Information required for the user may be displayed through the display unit 20 on the basis of information acquired through the reader 55. For example, when the user inserts the mobile device into the reader 55 for recognizing a barcode of a mobile boarding pass, the display unit 20 may display a boarding gate to which the user should move and guide the user on the basis of the information obtained through the mobile boarding pass.

Figure 4:
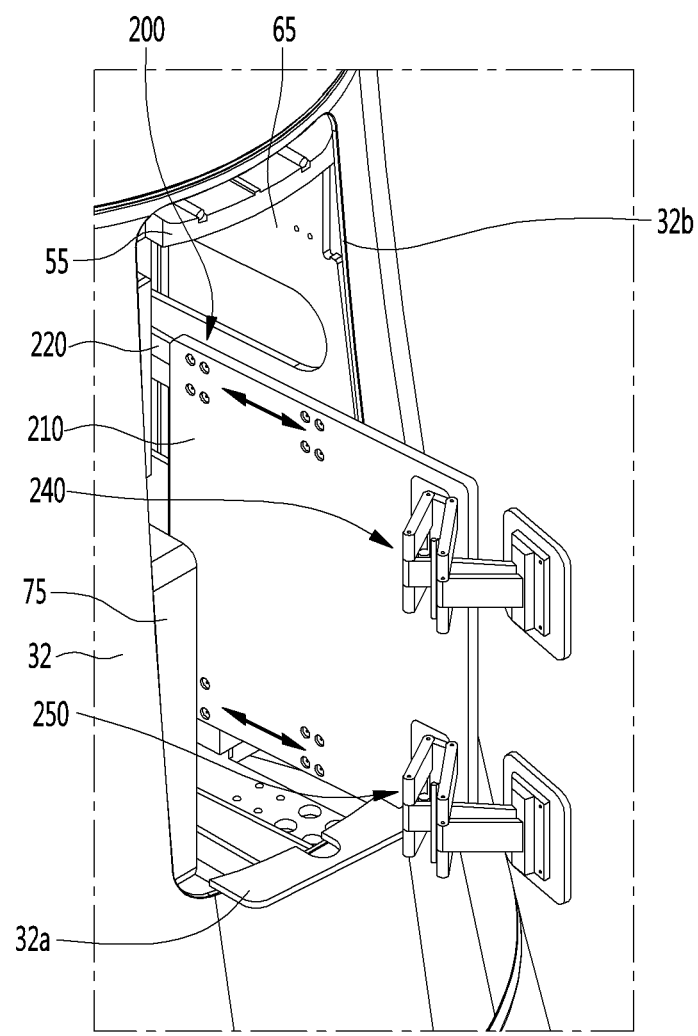
FIG. 4 is an enlarged view illustrating a portion of a guide robot according to a first embodiment.

A movement guide device 200 according to one embodiment will be described in detail with reference to FIGS. 4 and 7. The movement guide device or slidable or retractable guide 200 may include slide guides 220 and 221 installed on an inner surface of a second installation plate 65 and a guide plate 210 in which the slide guides 220 and 221 are inserted to slidably move.

The slide guides 220 and 221 may be provided as frames that extend radially in forward and backward along an inner surface of the second installation plate 65. For example, the slide guides 220 and 221 may include a first slide guide 220 positioned at an upper portion of the guide plate 210 and a second slide guide 221 located at a lower portion of the guide plate 210.

The first slide guide 220 may protrude by a predetermined distance from the inner surface of the second installation plate 65 to extend vertically from a protruding end thereof. For example, the first slide guide 220 may have a '┤' shape.

The second slide guide 221 may be provided below the first slide guide 220. The second slide guide 220 may protrude a predetermined distance from the inner surface of the second installation plate 65 to extend vertically from the protruding end thereof. The second slide guide 220 may have the same shape as the first slide guide.

The guide plate 210 may slidably move forward or backward inside a main body 10 through the guide of the slide guides 220 and 221. The guide plate 210 may slidably move forward or backward in an internal space of a body part 60, which is defined by the first and second installation plates 64 and 65.

In another aspect, the guide plate 210 may slidably move to be inserted into or withdrawn from the main body 10 along the inner surface of the second installation plate 65. The guide plate 210 may have various shapes. For example, the guide plate 210 may have a rectangular plate shape.

Guide connection parts or grooves 211 and 212 in which the slide guides 220 and 221 are inserted or connected to slidably move may be provided on one surface of the guide plate 210. An outer surface of the guide plate 210 may be understood as a surface that faces the inner surface of the second installation plate 65. The guide connection parts 211 and 212 may be provided on the outer surface of the guide plate 210.

The guide connection parts 211 and 212 may be located on the outer surface of the guide plate 210 to correspond to the slide guides 220 and 221. For example, the guide connection parts 211 and 212 may include a first guide connection part 211 in which the first slide guide 220 is inserted to slidably move and a second guide connection part 212 in which the second slide guide 221 is inserted to slidably move.

The first and second guide connection parts 211 and 212 may have shapes or contours corresponding to that of the first and second slide guides 220 and 221, respectively. For example, each of the first and second guide connection parts 211 and 221 may be a groove that is recessed in a "┤" shape inward from an outer surface of the guide plate 210 so that the "┤" shape is insertable therein.

The first and second guide connection parts 211 and 212 may allow the guide plate 210 to stably move forward or backward through the guidance of the first and second slide guides 220 and 221.

The movement guide device 200 may further include an opening device a retainer 300 that is capable of restricting the guide plate 210 and an insertion member or a pin 351 inserted into or withdrawn from the opening device 300.

The insertion member 351 may be provided on a side surface of the guide plate 210. In detail, the insertion member 351 may be provided on one surface of the guide plate 210, which faces the main body 10, when the guide plate 210 slidably moves to the inside of the main body 10, i.e., slidably moves forward into the body.

The insertion member 351 may have a protrusion shape and be provided in plurality. Also, the insertion member 351 may be installed on the guide plate to correspond to the position of the opening device 300.

The opening device 300 may be configured to insert or withdraw the insertion member 351 therethrough. The opening device 300 may be fixed so that the guide plate 210 is restricted and thus does not move again backward when the insertion member 351 is inserted and hooked by pressing of the user. The opening device 300 may be configured so that the hooking of the insertion member 351 is released by secondary pressing of the user.

The restriction of the guide plate 210 may be released to slidably move backward. The opening device 300 may be installed on the inner surface of the second installation plate 65. The opening device 300 may be provided in plurality. For example, the opening device 300 may be provided below the slide guides 220 and 221. The insertion member 351 may be provided on the guide plate 210 to correspond to the corresponding position. Thus, the insertion member 351 may be inserted into and hooked or latched to the opening device 300 when the guide plate 210 is maximally inserted into the main body 10. Structures of the insertion member 351 and the opening device 300 will be described later in detail.

Figure 5:
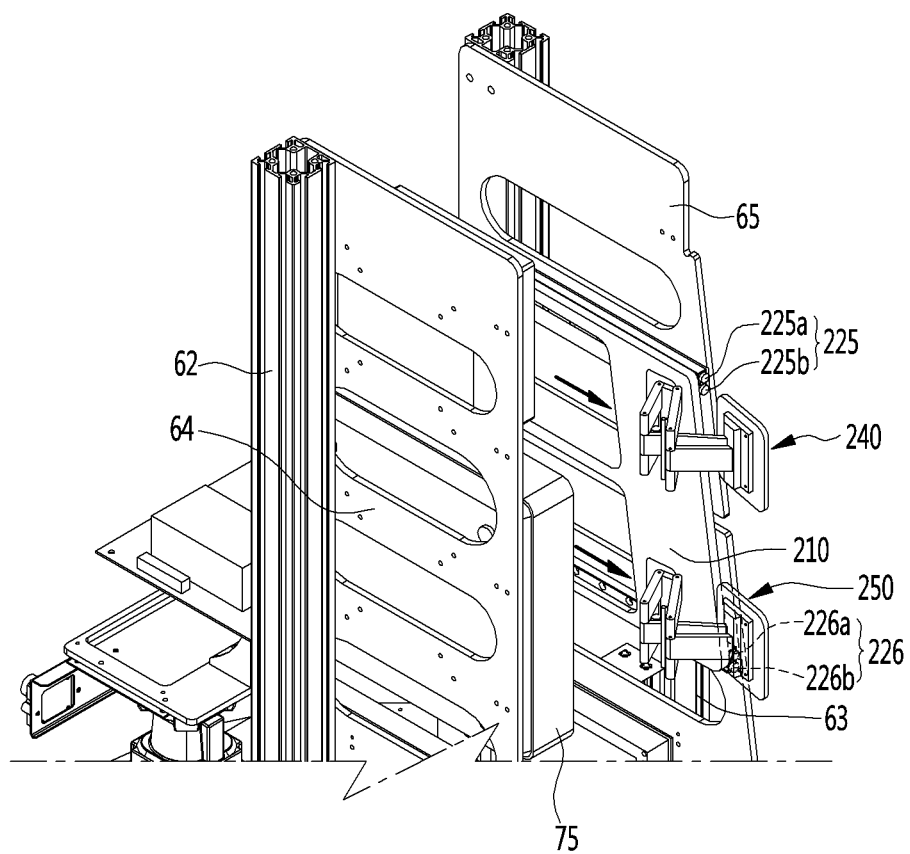
FIG. 5 is an enlarged view illustrating a portion of a guide robot according to a second embodiment.

A movement guide device 200 according to another embodiment (second embodiment) will be described in detail with reference to FIG. 5. A second embodiment is different from the foregoing first embodiment in shape of a guide plate 210 and constituents of a slide guide 220 and a guide connection part.

A movement guide device 200 of this embodiment may include a guide plate 210 connected to coupling devices 240 and 250 that will be described later. The guide plate 210 may have a plurality of recesses or openings to reduce a weight thereof. The guide plate 210 may be connected to a second installation plate 65 so as to be inserted into or withdrawn from an internal space of a main body 10 through slidable movement thereof.

The movement guide device 200 may further include roller guides 225 and 226 connecting the guide plate 210 to the second installation plate 65. The roller guides 225 and 226 may include upper rails 225a and 226a and lower rails 225b and 226b connected to the upper rails 225a and 226a through rollers for movement. The roller guides 225 and 226 may include a first roller guide 225 connected to an upper portion of an outer surface of the guide plate 210 and a second roller guide 226 connected to a lower portion of the outer surface of the guide plate 210. The guide plate 210 may be stably slid to move forward and backward by the first and second roller guides 225 and 226.

The first roller guide 225 may include the upper rail 225a connected to the upper portion of the guide plate 210 and the lower rail 225b connected to the second installation plate 65. The second roller guide 226 may include the lower rail 226b connected to the lower portion of the guide plate 210 and the upper rail 226a connected to the second installation plate 65, unlike the first roller guide 225.

The lower rail 225b of the first roller guide 225 connected to the second installation plate 65 and the upper rail 226a of the second roller guide 226 may be fixed, and the upper rail 225a of the first roller guide 225 connected to the guide plate 210 and the lower rail 226b of the second roller guide 226 may move forward and backward by the rollers.

Figure 6:
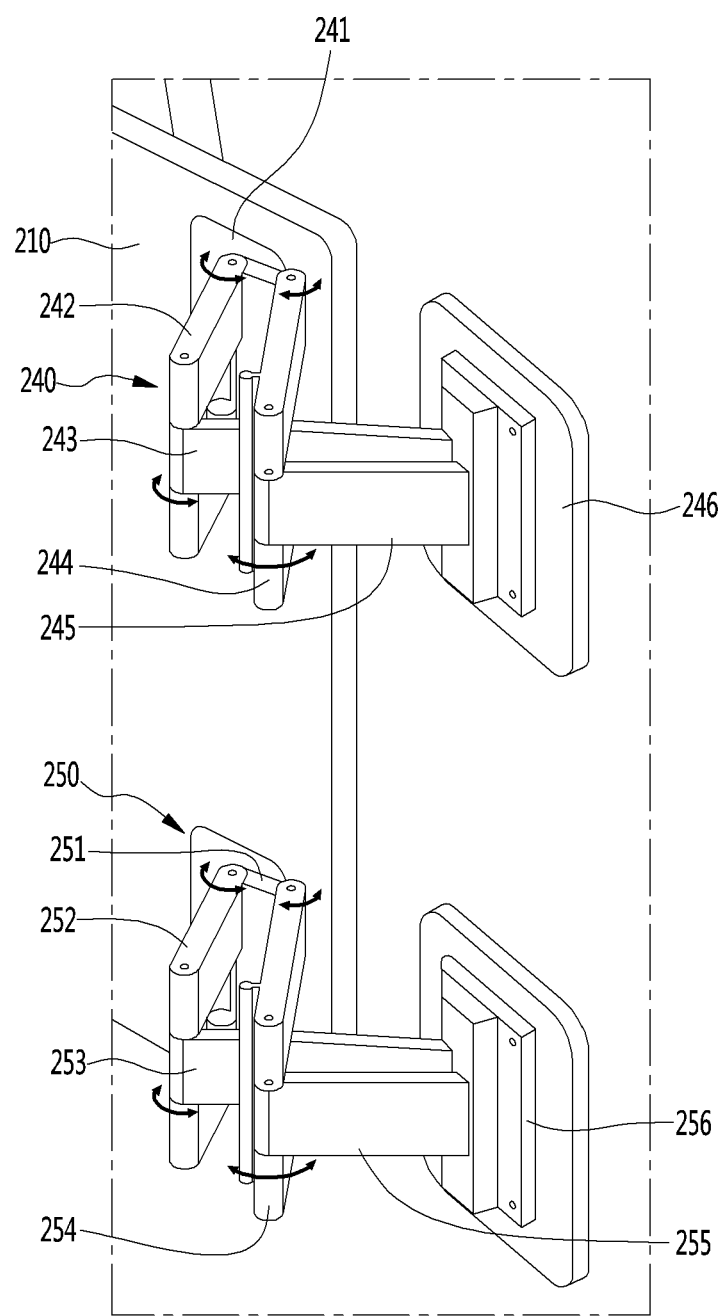
FIG. 6 is an enlarged view illustrating a coupling device of the guide robot according to an embodiment.

The coupling devices 240 and 250 connected to the guide plate 210 will be described in detail with reference to FIG. 6. The coupling devices 240 and 250 may be installed on the inner surface of the guide plate 210. That is, the coupling devices or hinges 240 and 250 may be provided on one surface of the guide plate 210, which faces a power board 75. The coupling devices 240 and 250 may be provided at a rear side of the inner surface of the guide plate 210. A display unit 20 provided on a rear portion of the main body 10 may be easily connected through the coupling devices 240 and 250.

The coupling devices 240 and 250 may include a plurality of coupling devices. For example, the coupling devices 240 and 250 may include a first coupling device or a first hinge 240 and a second coupling device or a second hinge 250 provided below the first coupling device 240.

The first coupling device 240 may include a first support plate 241 coupled to the guide plate 210, a first link 242 rotatably connected to the first support plate 241, a second link 243 rotatably connected to the first link 242, and a first attachment plate 246 connected to the second link 243 and coupled to a first installation groove 21a of the display unit 20.

The first support plate 241 may be located on an upper portion of the inner surface of the guide plate 210. The first support plate 241 may be hinge-coupled to the first link 242 and a third link 244. The first support plate 241 may be pin-jointed to the first link 242 and the third link 244. Thus, the first link 242 and the third link 244 may rotate at an angle of about 180 degrees with respect to a center of the support plate 241.

The first link 242 may have a rectangular shape with a central portion (a center) opened. The first link 242 may have one edge or end hinge-coupled to the first support plate 241 and the other edge or end that is symmetrical to the one edge or end and hinge-coupled to the second link 243 at a center thereof. The second link 243 may be rotatable by using the other edge or end of the first link 242 as a central axis.

In another aspect, the first link 242 may be rotatably connected by using the first support plate 241 as a central axis. The second link 243 may be rotatably connected by using the first link 242 as a central axis. The second link 243 may have a rectangular bar shape. The second link 243 may have one end connected to one end of the first link 242 and the other end connected to the first attachment plate 246.

The first attachment plate 246 may be coupled to the first installation groove 22a of the coupling part 22 and then be fixed. The first attachment plate 246 may have one surface connected to the second link 243 and the other surface connected to the first installation groove 22a.

The first attachment plate 246 may be coupled to the first installation groove 22a through a separate coupling member and then be fixed. When the user intends to separate the display unit 20 from the guide robot 1, the coupling member 240 coupled to the first attachment plate 246 and the first installation groove 22a may be released to easily separate the display unit 20 from the guide robot 1.

The first coupling device 240 may further include a third link 244 spaced apart from the first link 242 and rotatably connected to the support plate 241 and a fourth link 245 rotatably connected to the third link 244. The third link 244 may be rotatably connected by using the first support plate 241 as a central axis. The fourth link 245 may be also rotatably connected by using the third link 244 as a central axis.

The third link 244 may be provided at a rear side rather than the first link 242. The third link 244 may have a rectangular shape of which a central portion (a center) is opened, like the first link 242. However, the third link 244 may have a length greater than that of the first link 242. Since the second link 243 is provided in an opened middle space of the third link 244 at a position lower than that of the fourth link 245, the second link 243 may be movable in a range of a predetermined angle.

The third link 244 may have one edge or end hinge-coupled to the support plate 241 and the other edge or end that is symmetrical to the one edge and hinge-coupled to the fourth link 245 at a center thereof. Thus, the fourth link 245 may be rotatable by using the other edge of the third link 244 as a central axis.

The fourth link 245 may have the same rectangular bar shape as the second link 243. However, the fourth link 245 may have a length less than that of the second link 243. Since the second link 243 is coupled to the first link 242 at a front position rather than the fourth link 245, the second link 243 is likely to have a length greater than that of the fourth link 245 so as to be vertically connected to one surface of the first attachment plate 246.

The fourth link 245 may have one end connected to one end of the third link 244 and the other end connected to the first attachment plate 246. The fourth link 245 may be spaced apart from the second link 243 and connected to the first attachment plate 246.

In summary, the first link 242 may have a length less than that of the third link 244, and the second link 243 may have a length less than that of the fourth link 245.

Thus, the second link 243 connected to the first link 242 may be rotatable in the opened middle space of the third link 244 and simultaneously be connected to one surface of the first attachment plate 246 that is a plane perpendicular thereto together with the fourth link 245. Since the first to fourth links 242 to 245 are rotatably movable in a range of a predetermined angle, the display unit 20 connected to the other surface of the attachment plate 246 may be rotatable in a range of a predetermined angle without considering an interference with other components. Arrow solid lines of FIG. 6 indicates rotational directions of the first to fourth links 242 to 245.

The second coupling device 250 may include a second support plate 251 provided below the first support plate 241 and coupled to the guide plate 210, a first link 252 rotatably connected by using the second support plate 251 as a central axis, a third link 254 rotatably connected by using the second support plate 251 as a central axis at a position spaced apart from the first link 252, a second link 253 rotatably connected by using the first link 252 as a central axis, a fourth link 255 rotatably connected by using the third link 254 as a central axis, and a second attachment plate 256 to which the second link 253 and the fourth link 255 are coupled at positions spaced apart from each other.

The second coupling device 250 may have the same constituent and the same connection relationship between the constituents as the first coupling device 240. Thus, the duplicated descriptions of the second coupling device 250 may be derived from those of the first coupling device 240.

Figure 7:
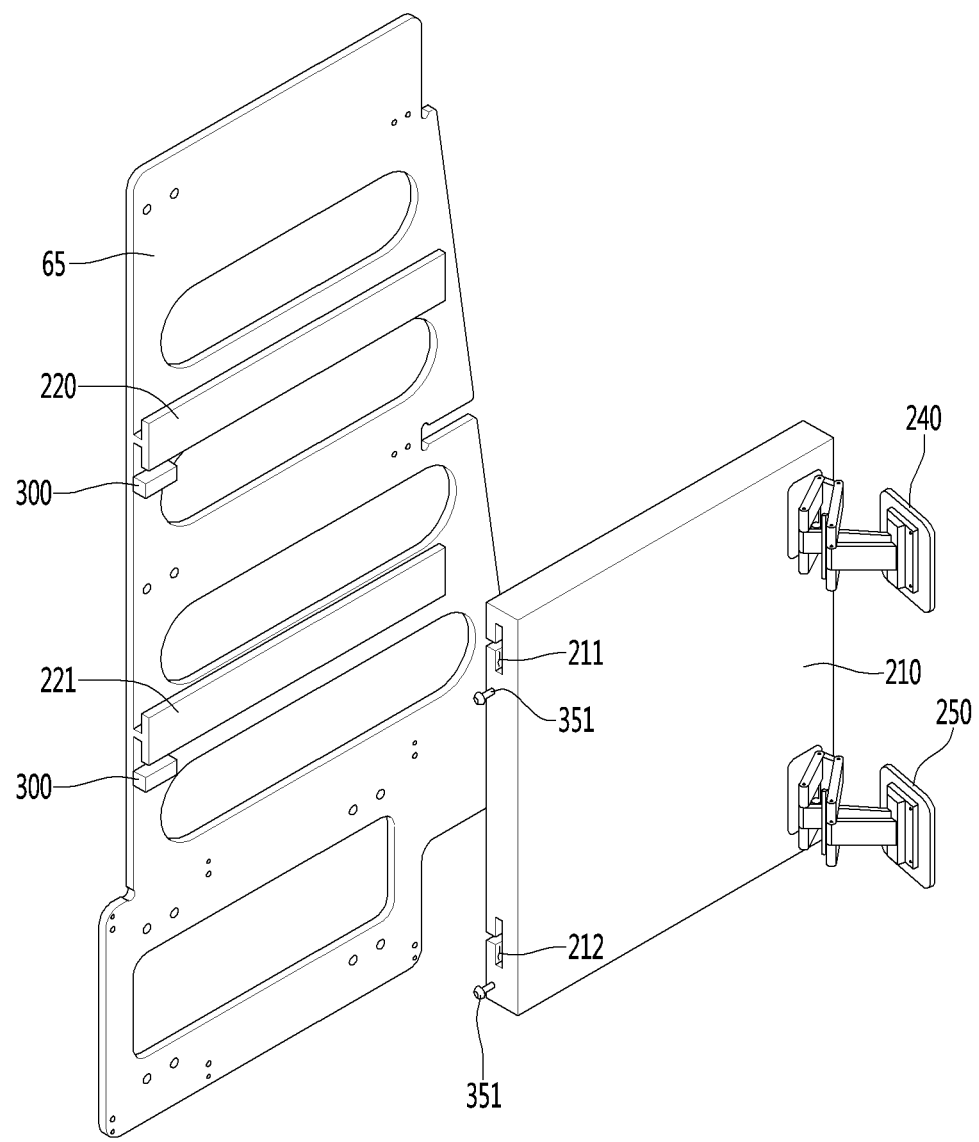
FIG. 7 is an enlarged view illustrating a connection relationship between a movement guide device and a slide guide of the guide robot according to the first embodiment.
Figure 8:
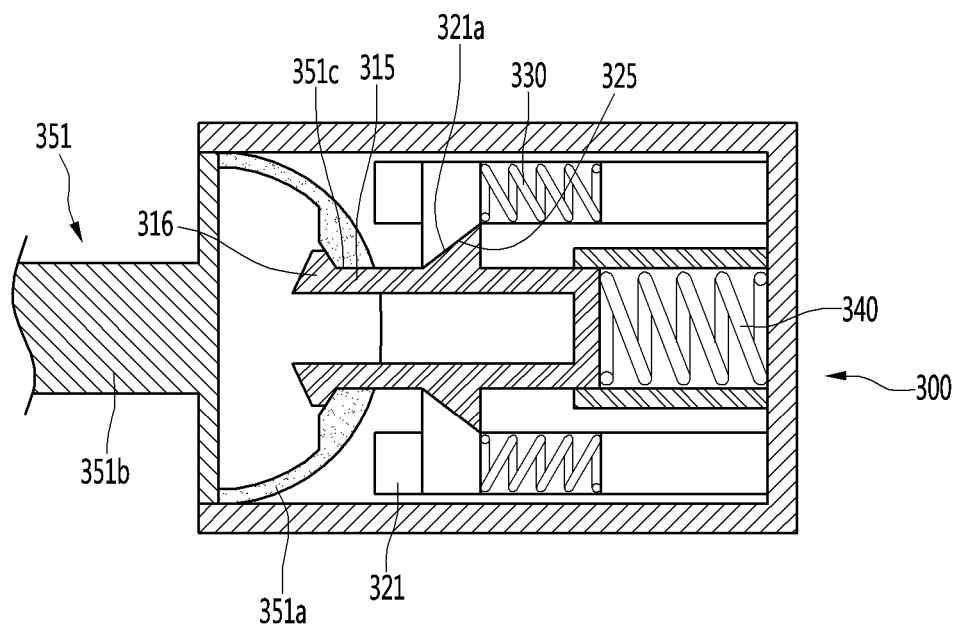
FIG. 8 is a cross-sectional view illustrating a state in which an opening device and an insertion member of the guide robot are coupled to each other according to an embodiment.
Figure 9:
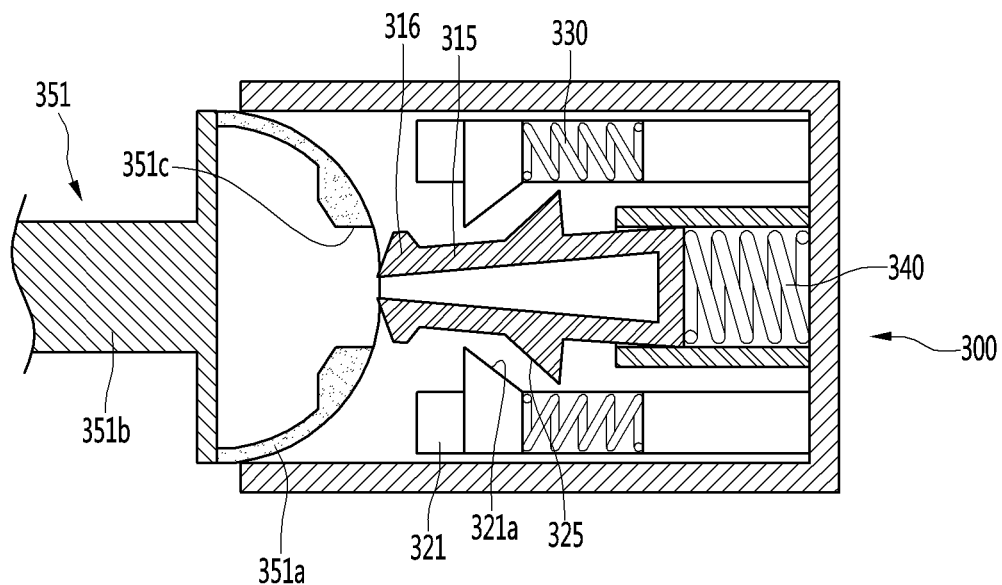
FIG. 9 is a cross-sectional view illustrating a state in which the opening device and the insertion member of the guide robot are separated from each other according to an embodiment.

FIG. 7 is an enlarged view illustrating a connection relationship between the movement guide device and the slide guide of the guide robot according to the first embodiment, FIG. 8 is a cross-sectional view illustrating a state in which the opening device and the insertion member of the guide robot are coupled to each other according to an embodiment, and FIG. 9 is a cross-sectional view illustrating a state in which the opening device and the insertion member of the guide robot are separated from each other according to an embodiment.

As described above, the movement guide device 200 may further include the opening device 300 and the insertion member 351. Hereinafter, coupling between the opening device 300 and the insertion member 351 and releasing of the coupling will be described in detail.

Referring to FIGS. 7 to 9, the movement guide device 200 according to an embodiment may further include the opening device 300 installed on the inner surface of the second installation plate 65 to extend backward from one point of the inner surface of the second installation plate 65. The opening device 300 may be provided below the slide guides 220 and 221.

The opening device 300 may have an insertion part that is an opening into which the insertion member 351 provided on one surface of the guide plate 210 is inserted. The opening device 300 may include a hook member 315 that is selectively hooked to the insertion member 351 while the insertion member 351 is inserted and withdrawn.

The insertion member 351 may be provided on the front surface of the guide plate 210, which faces the main body 10, and selectively coupled to the opening device 300. The insertion member 351 may include a protrusion part 351a inserted into the insertion part and a rail connection part 351b connecting the protrusion part 351a to the guide plate 210. Here, the insertion member 351 may be defined as a portion of the guide plate 210.

The rail connection part 351b or shaft may extend forward from the guide plate 210, and the protrusion part or head 351a may be coupled to one end of the rail connection part 351b. The protrusion part 351a may be spaced a predetermined distance forward from the guide plate 210.

The protrusion part 351a may have an opened end 351c that is opened forward to accommodate the hook member 315 or hook. The hook member 315 may have a hook end 316 that is hooked with an inner surface of the protrusion part 351a. The hook member 315 may be provided in plurality, and the plurality of hook members 315 may be spaced apart form each other.

Each of the hook members 315 may be deformed or deflect in a direction in which the plurality of hook members 315 approach each other. The hook end 316 may include an inclined surface so that the hook member 315 is easily inserted into the opened end 351c. The inner surface of the protrusion part 351a, which is hooked with the hook end 316, may have an inclined surface corresponding to the hook end 316.

While the insertion member 351 is inserted into the opening device 300, the hook end 316 may be inserted into the protrusion part 351a while being guided along the opened end 351c. Each of the plurality of hook members 315 may be elastically deformed in the direction in which the plurality of hook members 315 approach each other.

When the hook member 315 is completely inserted into the protrusion part 351a, each of the plurality of hook members 315 returns to its original direction or shape and then is hooked with the inner surface of the protrusion part 351a.

The opening device 300 may include a pressed part or a bumper 321 that is pressed by the insertion member 351 while the insertion member 351 moves backward and a first elastic member or spring 330 that allows the pressed part 321 to be elastically movable. The pressed part 321 and the first elastic member 330 may be provided in plurality on both inner sides of the opening device 300.

The pressed part 321 may include an inclined surface corresponding part 321a that is inclined in one direction. The hook member 315 may include an inclined surface 325 provided on at least a portion of the hook member 315 to correspond to the inclined surface corresponding part 321a and a second elastic member or spring 340 that allows the hook member 315 to be elastically movable backward. The second elastic member 340 may have an elastic coefficient less than that of the first elastic member 330.

To insert the coupling part 22 of the display unit 20 into the coupling hole 32b, when the display unit 20 is pressed forward (forward being in direction of forward movement of the guide robot), the guide plate 210 may be inserted into the main body 10 along the slide guides 220 and 221, and the insertion member 351 may be inserted into the opening device 300. The hook member 315 may be inserted into the protrusion part 351a, and the hook end 316 may be hooked with the inner surface of the hook protrusion part 351a. As a result, the guide plate 210 may be coupled to the slide guides 220 and 221 and thus fixed to the second installation plate 65. The coupling part 22 of the display unit 20 may be maintained in the state of being inserted into the coupling hole 32b.

For example, a coupling part connection device such as a door catch, a magnet latch, and the like may be provided at one side of the coupling hole 32b. The coupling part connection device may couple the coupling part 22 to the coupling hole 32b through a magnet or a latch to stably maintain the coupling between the display unit 20 and the main body 10.

In the state in which the insertion member 351 is coupled to the opening device 300, when the display unit 20 is pushed, the insertion member 351 may move backward, i.e., in a direction in which the display is oriented. Thus, the pressed part 321 is pressed while the insertion member 351 moves, and the pressed part 321 moves backward. Here, the first elastic member 330 may be compressed. While the pressed part 321 moves backward, the inclined surface corresponding part 321a may press the inclined surface 325.

In this process, force applied backward and force applied to a direction in which the plurality of hook members 315 are pushed down may be applied to the inclined surface 325. Thus, each of the plurality of hook members 315 may be deformed in the direction in which the plurality of hook members 315 approach each other to move backward.

Also, the hook end 316 may be released in hook with the protrusion part 351a to move to the outside of the protrusion part 351a. Here, the second elastic member 340 may be compressed. Also, when the pushing operation of the display unit 20 is stopped, the first elastic member 330 may return to its original direction, and thus, the pressed part 321 may move forward to push the protrusion part 351a forward.

The protrusion part 351a may move to the outside of the opening device 300 by the applying force of the pressed part 321 and thus be separated from the opening device 300. As a result, the display unit 20 may be withdrawn backward by a predetermined distance.

Also, when the display unit 20 is pulled, the coupling part 22 may be separated from the coupling hole 32b, and the coupling part 22 may be withdrawn backward from the main body 10 together with the guide plate 210. That is, the insertion member 351 and the opening device 300 may be selectively coupled to each other according to the pressing number of display unit 20. For example, the coupling part 22 of the display unit 20 may be inserted into the main body 10 by a primarily pressing or pushing operation and be easily withdrawn by a secondarily pulling operation. As a result, the difficulty that the user has to assert a lot of force to withdraw out the display unit 20 may be solved.

Figure 10:
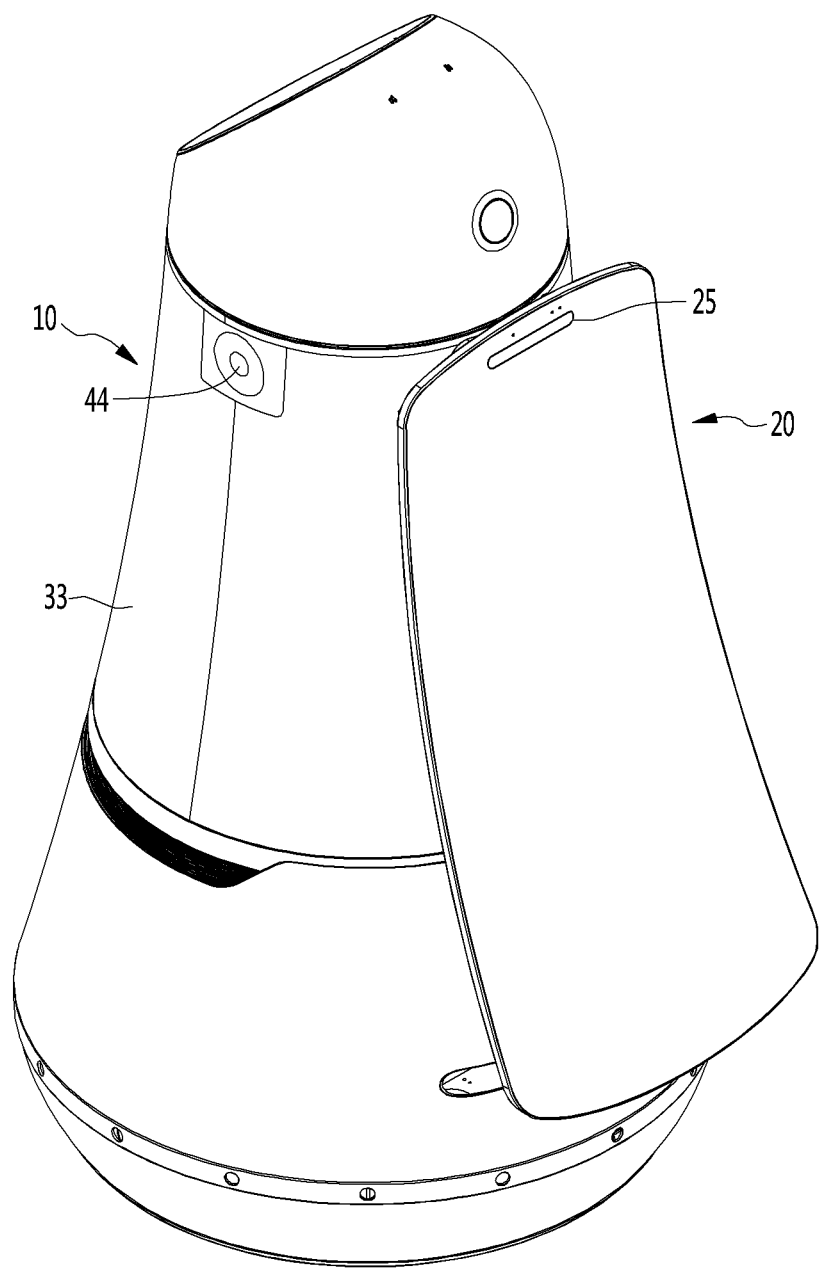
FIGS. 10 to 12 are rear perspective views sequentially illustrating a process of opening a display unit of the guide robot according to an embodiment.
Figure 11:
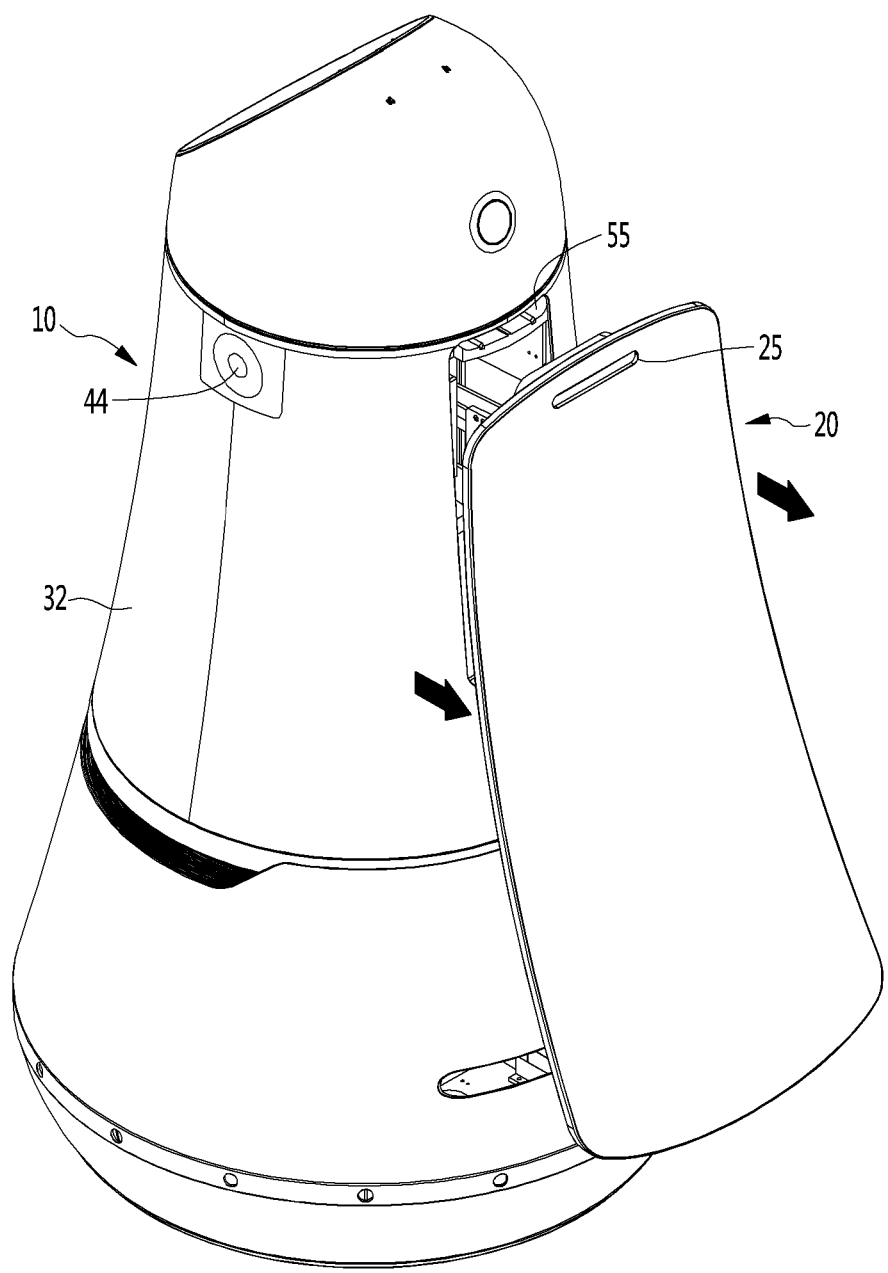
Figure 12:
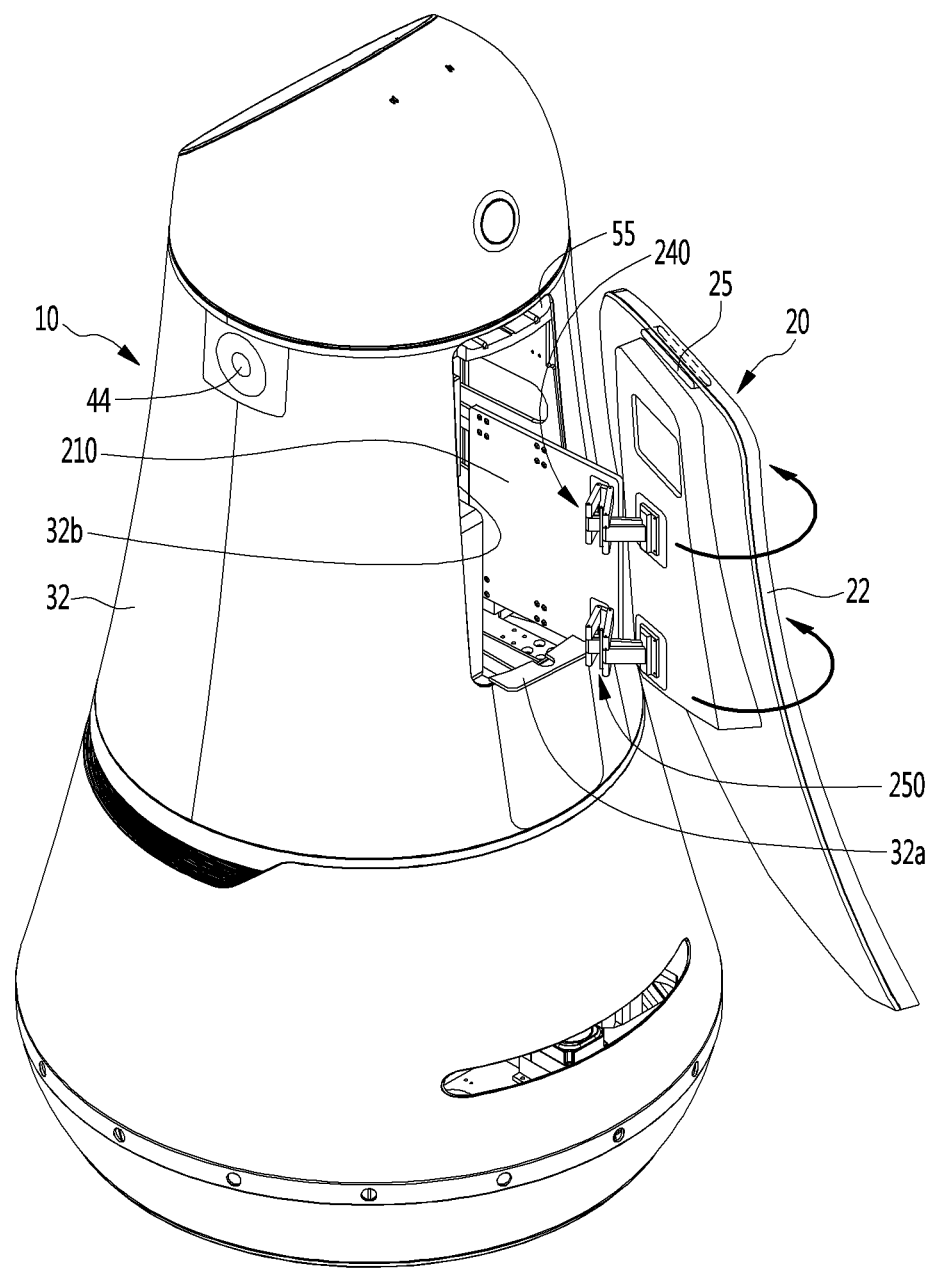
Figure 13:
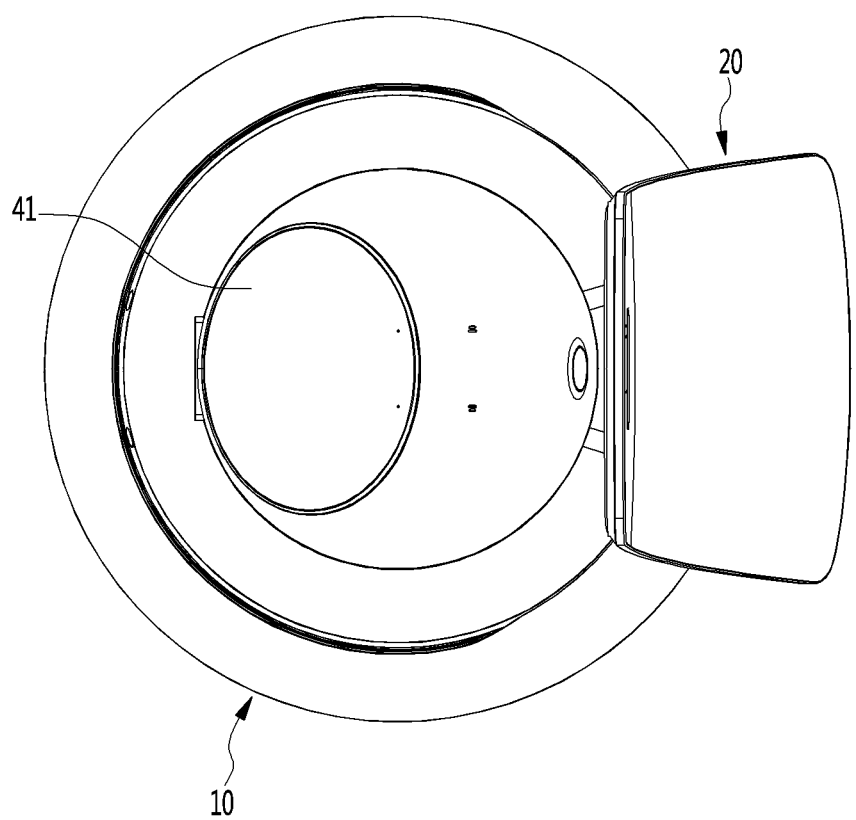
FIGS. 13 to 15 are plan views sequentially illustrating a process of opening the display unit of the guide robot according to an embodiment.
Figure 14:
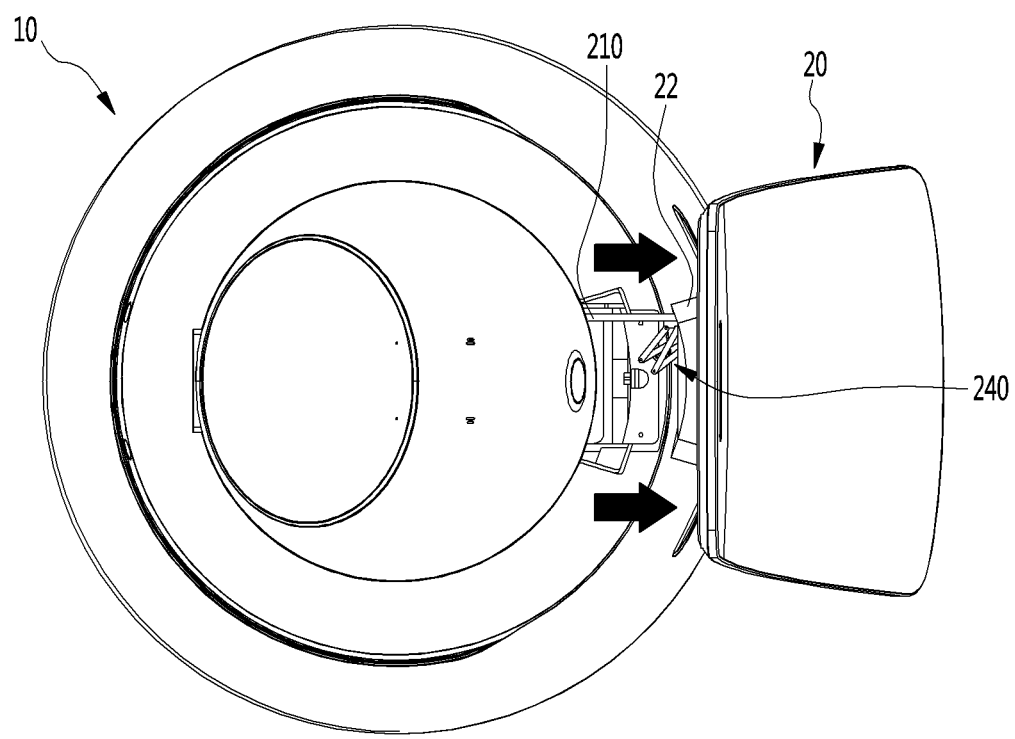
Figure 15:
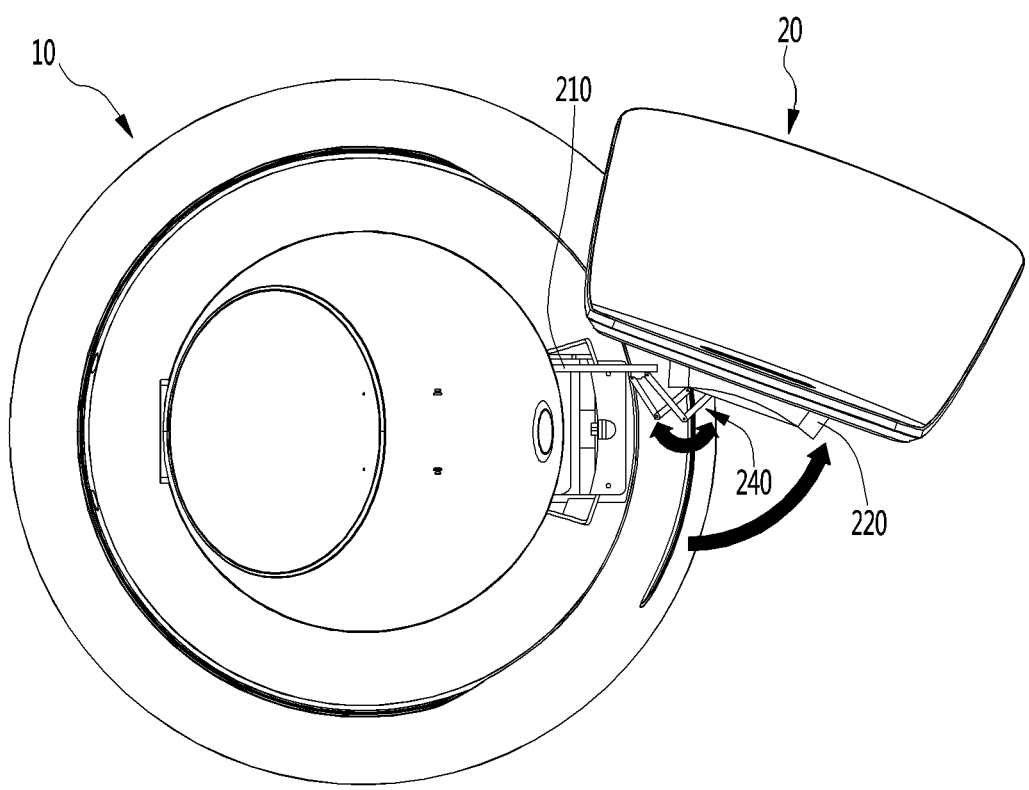
Figure 16:
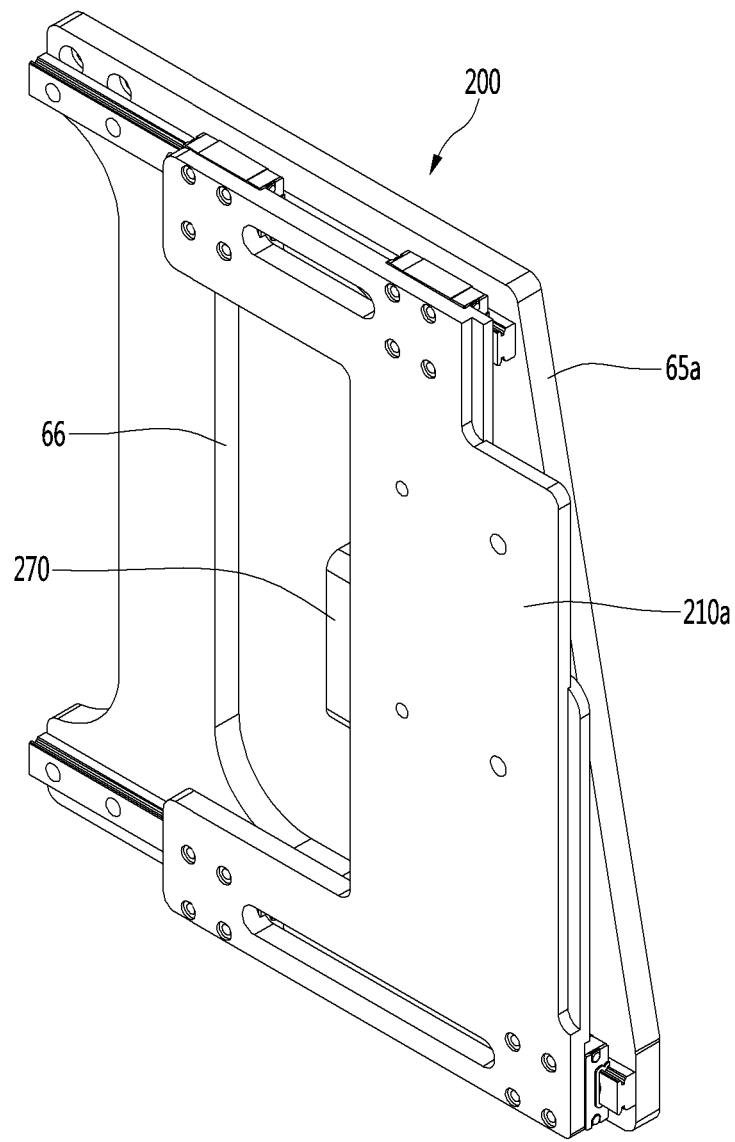
FIG. 16 is a perspective view illustrating a portion of a guide robot according to a third embodiment.
Figure 17:
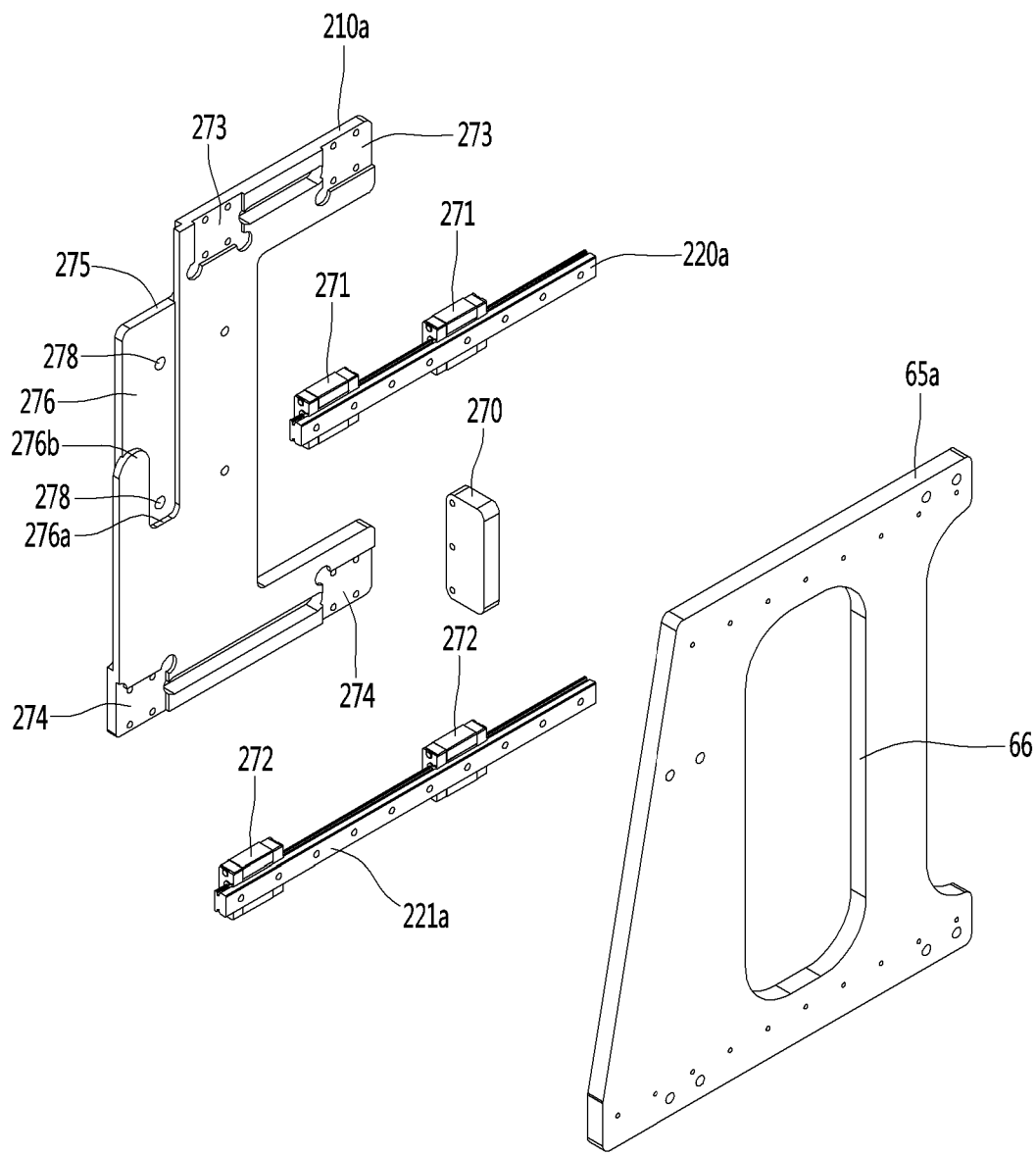
FIG. 17 is an enlarged view of FIG. 16.
Figure 18:
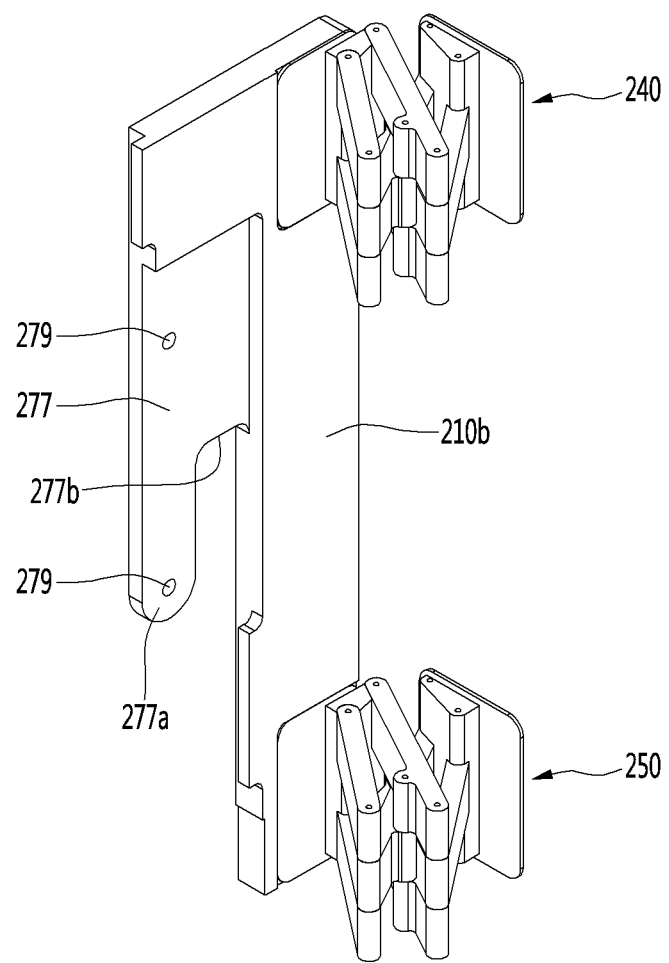
FIG. 18 is a perspective view illustrating a portion of the guide robot according to the third embodiment.
Figure 19:
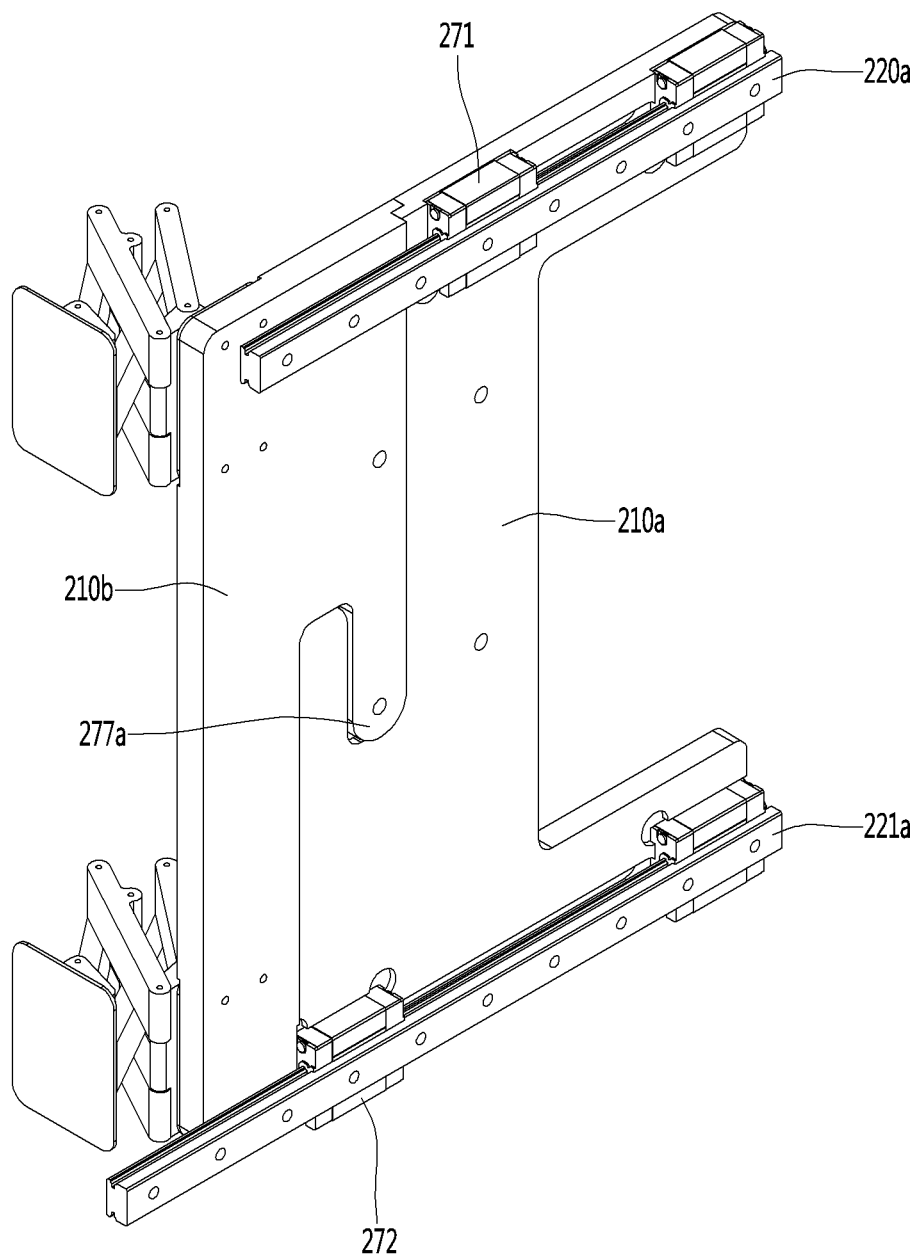
FIG. 19 is a perspective view illustrating a movement guide device of the guide robot according to the third embodiment.

FIGS. 10 to 12 are rear perspective views sequentially illustrating a process of opening the display unit of the guide robot according to an embodiment, and FIGS. 13 to 15 are plan views sequentially illustrating a process of opening the display unit of the guide robot according to an embodiment. The opening or closing operation of the display unit 20 will be described in more detail with reference to FIGS. 10 to 15.

As described above, the display unit 20 may perform the opening or closing operation for opening or closing the coupling hole 32b that is the opening of the main body 10. The opening operation may represent an operation for opening the coupling hole 32b by releasing the coupling between the display unit 20 and the main body 10.

The opening operation may start from the closed state in which the display unit 20 closes the coupling hole 32b of the main body 10. The user may push the display unit 20 from the coupling hole 32b of the main body 10. For example, when the user presses the display unit 20 forward, the locked state of the insertion member 351 in the opening device 300 may be released. The display unit 20 may be withdrawn by a predetermined distance backward, i.e., in an outward direction of the coupling hole 32b by the elastic force.

Thereafter, the user may pull the display unit 20 backward. Since the user provides the pulling force to the display unit 20, the pulling force may be transferred to the coupling devices 240 and 250 connecting the coupling part 22 of the display unit 20 to the guide plate 210 of the movement guide device 200. Thus, the guide plate 210 may slidably move backward, and the guide plate 210 may be withdrawn from the coupling hole 32b according to the guidance of the slide guide 220.

When the guide plate 210 is maximally withdrawn backward from the coupling hole 32b, the display unit 20 may be withdrawn to the rearmost position. This state may be called the pulled state of the display unit 20. Thereafter, the display unit 20 may rotate in a clockwise or counterclockwise direction by the coupling devices 240 and 250. The display unit 20 may rotate at a predetermined angle through the rotation of the plurality of links 242, 243, 244, 245, 252, 253, 254, and 255 provided in the coupling devices 240 and 250. Thus, the display unit 20 may rotate to completely open the coupling hole 32b of the main body 10. This state may be called the opened state, and the opening operation may be completed.

The closing operation may represent an operation for allowing the display unit 20 to appear integrated to the main body 10 by closing the coupling hole 32b. The closing operation may be understood in a reverse order of the opening operation. Thus, the closing operation may start from the opened state. The user may rotate the coupling part 22 of the display unit 20 in the reverse order so as to allow the coupling part to be provided at a position corresponding to the coupling hole 32b. This state may be called a state that returns to its regular position.

Thereafter, the user may push the display unit 20 forward. Since the user provides the pushing force to the display unit 20, the guide plate 210 connected to the display unit 20 may slidably move forward. The guide plate 210 may be inserted into the coupling hole 32b according to the guidance of the slide guide 220.

When the guide plate 210 is maximally inserted into the coupling hole 32b, and the bottom surface of the coupling part 22 is seated on the seating part 32a, the main body 10 and the display unit 20 may be integrally coupled to each other to provide the closed state.

The insertion member 351 of the movement guide device 200 may be inserted into and coupled to the opening device. Thus, the closed state of the display unit 20 may be stably maintained, and the closing operation is completed.

Since the display unit 20 performing the opening operation and the closing operation to open and close the coupling hole 32b of the main body 10 performs a function as a door of the main body 10, the display unit 20 may be called a "door unit", a "door display unit", or a "door type display unit".

A guide robot according to a third embodiment will be described in detail with reference to FIGS. 16 to 19. The third embodiment is different from the first and second embodiments in that a display unit 20 is configured to be easily separated from or coupled to a movement guide device 200. In the third embodiment, descriptions duplicated with the first or second embodiment will be derived from those of the first or second embodiment.

Since the opening operation of the display unit 20 according to the first and second embodiments is performed to rotate at a small rotational angle of the display unit 20, a portion of the coupling hole 32b may be opened, and thus, it may be difficult to allow a worker to access the main components within the guide robot. However, according to the third embodiment, since the rotating display unit 20 is capable of being easily separated or coupled, the accessibility to the internal main components may be improved.

A movement guide device 200 of a guide robot 1 according to the third embodiment may include slide guides 220a and 221a coupled to a second installation plate 65a, sliders 271 and 272 connected to the slide guides 220a and 221a for slide movement, a first guide plate 210a coupled to the sliders 271 and 272, a stopper 270 restricting movement of the first guide plate 210a, and a second guide plate 210b connecting the first guide plate 210a to a display unit 20.

The second installation plate 65a may be connected to one side of each of main frames 62 and 63 and have a vertical length corresponding to that of each of the guide plates 210a and 210b. The second installation plate 65a may have a compact dimension corresponding to a size of each of the guide plates 210a and 210b.

The slide guides 220a and 221a may be coupled into the second installation plate 65a. Since the slide guides 220a and 221a guide insertion and withdrawal of the first guide plate 210a through the movement of the sliders 271 and 272, the slide guides 220a and 221a may extend radially in the insertion or withdrawal direction of the first guide plate 210a. The insertion or withdrawal direction may be understood as a forward or backward direction.

The slide guides 220a and 221a may be provided in plurality. The plurality of slide guides 220a and 221a may be coupled to the second installation plate 65a so as to be spaced apart vertically from each other. The slide guides 220a and 221a may include a first slide guide 220a coupled to an upper portion of the second installation plate 65a and a second slide guide 221a coupled to a lower portion of the second installation plate 65a.

The sliders 271 and 272 may allow the slide guides 220a and 221a to be inserted therein and then slidably move along the extension direction of the slide guides 220a and 221a. The sliders 271 and 272 may be provided in plurality. The sliders 271 and 272 may include an upper slider 271 slidably moving along the extension direction of the first slide guide 220a and a lower slider 272 slidably moving along the extension direction of the second slide guide 220b. Also, the upper slider 271 and the lower slider 272 may be provided in plurality.

The sliders 271 and 272 may have one surface into which the slide guides 220a and 221a are inserted and the other surface coupled and fixed to the first guide plate 210a. The sliders 271 and 272 may allow the slide guides 220a and 221a to be inserted therein in a direction facing the second installation plate 65a and then slidably move. Each of the sliders 271 and 272 and the slide guides 220a and 221a may include a linear motion bearing (e.g., a linear motion (LM) guide).

The first guide plate 210a may include an upper slider coupling groove or recess 273 for attaching the upper slider 271 in the direction facing the second installation plate 65a and a lower slider coupling groove or recess 274 coupled for attaching the lower slider 272. The upper slider coupling groove 273 may be located on an upper end of the first guide plate 210 and may be formed to correspond to the number of upper sliders 271. The lower slider coupling groove 274 may be located on a lower end of the first guide plate 210 and may be formed to correspond to the number of lower sliders 272. The first guide plate 210a may be withdrawn from or inserted into the coupling hole 32b by the linear forward and backward motion of the sliders 271 and 272 coupled to the upper and lower slider coupling grooves 273 and 274.

The second installation plate 65a may have a hook hole 66 in a central portion thereof. The hook hole 66 may be understood as a space in which the stopper 270 connected to the first guide plate 210a moves according to the withdrawal or insertion of the first guide plate 210a. The first guide plate 210a may have a '⊏' shape to reduce a weight thereof. The stopper 270 may be coupled to the position of the first guide plate 210a, which is recessed inward.

The stopper 270 may be provided on one side of the first guide plate 210a to be movable with a space of the hook hole 66 of the second installation plate 65a. The stopper 270 may move depending on the linear forward and backward movement of the first guide plate 210a in the hook hole 66.

The stopper 270 may be provided on a front end of the first guide plate 210a to come into contact with a rear end of the hook hole 66 at a maximally withdrawn distance of the first guide plate 210a. The withdrawn distance of the first guide plate 210a may be restricted by the contact with the stopper 270. Thus, the sliders 271 and 272 connecting the first guide plate 210a to the second installation plate 65a may be prevented from being separated from the slide guides 220a and 221a.

The first guide plate 210a may include a cutout part 275 coming into contact with the second guide plate 210b, a first assembly part 276, and an insertion groove 276a. The cutout part 275, the first assembly part 276, and the insertion groove 276s may be provided in the first guide plate 210a so that the second guide plate 210b is mounted to the first guide plate 201a.

The cutout part 275 may be provided on the upper end of the first guide plate 210a. In detail, the cutout part 275 may be formed by cutting a portion of the upper portion of the first guide plate 210a into a '⌐' shape so that an upper portion of the second guide plate 210b is seated thereon. For example, the cutout part 275 may be vertically recessed inward with respect to a vertex defined by the rear end and the upper end of the first guide plate having a rectangular shape. Also, the cutout part 275 may be provided below the second guide plate 210b to support the upper end of the second guide plate 210b.

The first assembly part 276 may be formed by recessing one surface of the first guide plate 210a. In detail, the first assembly part 276 may be defined as a surface that is recessed downward from the cutout part 275 to one point of the rear end of the first guide plate 210a.

The first guide plate 210a may have a stepped surface so that the rear end provided in the withdrawal direction has a height less than that of the front end provided in the insertion direction due to the first assembly part 276. Here, one surface of the first assembly part 276, which forms the stepped portion of the first guide plate 210a, may be called a first stepped surface.

The first assembly part 276 may be provided to correspond to a second assembly part 277 of the second guide plate 210b. The first assembly part 276 and the second assembly part 277 may have shapes matching each other for mating the first and second assembly parts 276 and 277. The first assembly part 276 may come into contact with the second assembly part 277 of the second guide plate 210b. One surface of the first guide plate 210a may be flat without having a stepped portion due to the contact between the first assembly part 276 and the second assembly part 277.

The first assembly part 276 and the second assembly part 277 may be coupled to each other through coupling by a fixing member 280, e.g., a threaded knob. Here, the first guide plate 210a and the second guide plate 210b may be coupled to each other.

The insertion groove 276a may extend downward from the first assembly part 276 along the stepped surface. The stepped surface of the insertion groove 276a may have a width less than that of the stepped surface of the first assembly part 276. The insertion groove 276a may also have a stepped portion at a position that is spaced apart forward from the rear end of the first guide plate 210a. Thus, the first guide plate 210a may include an outer projection 276b on the rear end of the first guide plate 210a.

The insertion groove 276a may have the same shape as the protrusion 277a of the second guide plate 210b. The insertion groove 276a may allow the protrusion 277a of the second guide plate 210b to be fitted therein.

The first assembly part 276 may have a first fixing hole 278. The first fixing hole 278 may be understood as a position into which the fixing member 280 for coupling the second guide plate 210b is inserted. The first fixing hole 278 may be provided in plurality. The first fixing hole 278 may be defined to correspond to a second fixing hole 279 of the second assembly part 277. The fixing member 280 may be inserted into the first fixing hole 278 and the second fixing hole 279 to couple the first guide plate 210a to the second guide plate 210b.

The second guide plate 210b may be seated and supported to come into contact with the first assembly part 276. The second guide plate 210b may include the second assembly part 277 and the protrusion 277a, which correspond to those of the first assembly part 276.

The second assembly part 277 may be formed by recessing one surface of the second guide plate 210b from the front end up to one point toward the rear end. One surface of the second guide plate 210b may have a stepped portion. The one surface of the second guide plate 210b may be understood as a surface coming into contact with the first guide plate 210a.

One surface of the second assembly part 277, which forms the stepped portion of the second guide plate 210b, may be called a second stepped surface. The second stepped surface may have the same shape as the first stepped surface. That is, the second assembly part 277 may have the same shape as the first assembly part 276 to come into contact with the first assembly part 276.

The protrusion 277a may have a stepped surface extending downward from a lower end of the second assembly part 277. The stepped surface of the protrusion 277a may have a width less than that of the stepped surface of the second assembly part 277. The stepped surface extending by the protrusion 277a may extend along the front end of the second guide plate 210b to define a groove 277b in the second guide plate 210b. The inner groove 277b of the second guide plate 210b may be understood as a space into which the outer projection 276b of the first guide plate 210a is inserted.

In summary, the first and second guide plates 210a and 210b may include the first and second assembly parts 276 and 277, which are assembled with and connected to each other. Further, the second guide plate 210b may be seated on and supported by the cutout part 275 of the first guide plate 210a.

The insertion groove 276a and the protrusion 277a, which have shapes corresponding to each other, may be provided so that the first guide plate 210a and the second guide plate 210b are stably mated with each other. In addition, the outer projection 276b of the first guide plate 210a and the inner groove 277b of the second guide plate 210b may be provided.

The first guide plate 210a and the second guide plate 210b may be fitted with respect to each other and thus assembled. Thus, the second guide plate 210b coupled to the display unit 20 may be stably fixed or supported.

Particularly, since the second guide plate 210b is seated on the upper portion of the first guide plate 210a and then inserted into the first assembly part 276 and assembled, the worker may disassemble or assemble the display unit 20 without applying relatively large force because the display unit 20 is stably supported when the display unit 20 is disassembled or assembled. When disassembled or assembled, it may prevent the display unit 20 from dropping downward after removing the fixing member 280.

The second guide plate 210b may be coupled to the first coupling device 240 and the second coupling device 250. The first coupling device 240 and the second coupling device 250 may be coupled in a state in which the first coupling device 240 and the second coupling device 250 are spaced apart from each other on one side of the second guide plate 210b. For example, the first coupling device 240 may be provided to face the outside of the upper end of the second guide plate 210b, and the second coupling device 250 may be provided to face the outside of the lower end of the second guide plate 210b.

The second guide plate 210b may be connected to the display unit 20 by the first and second coupling devices 240 and 250. Descriptions with respect to the first and second coupling devices 240 and 250 will be derived from those in the abovementioned first and second embodiments.

Figure 20:
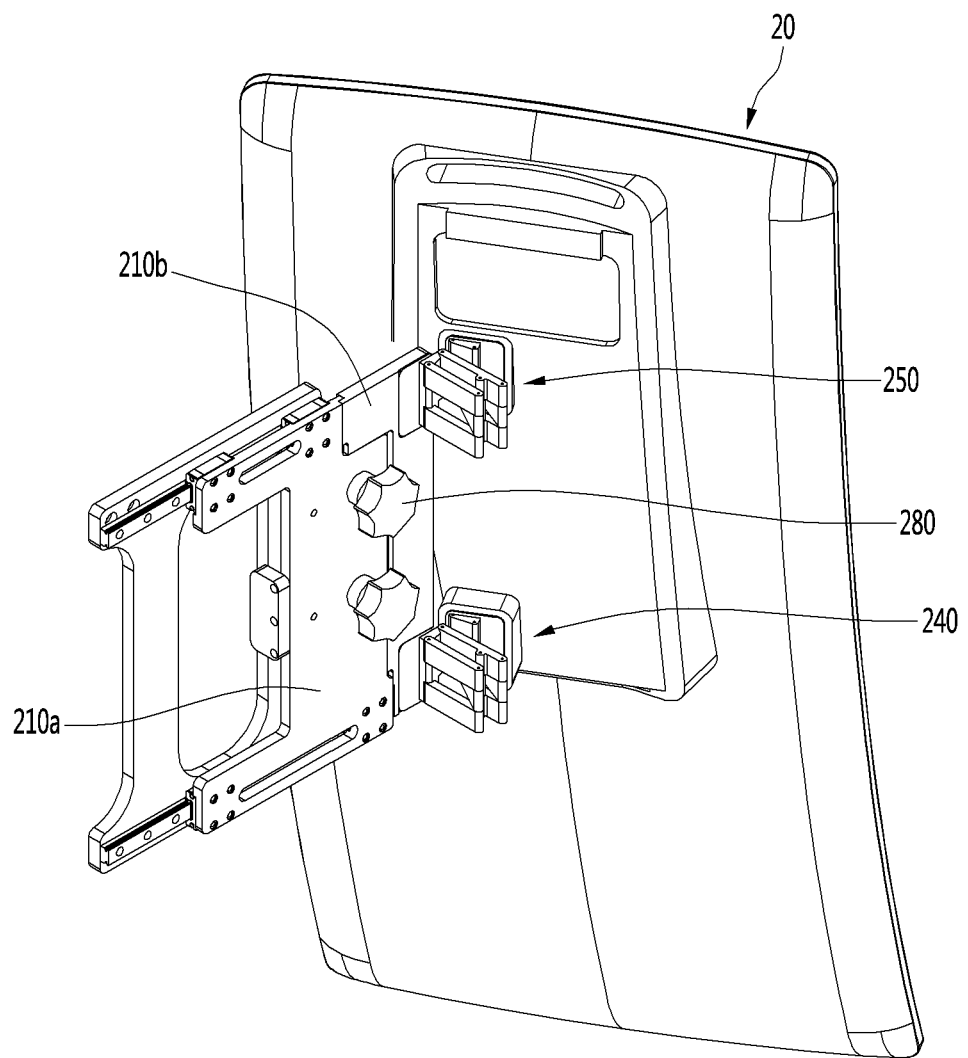
FIGS. 20 to 22 are views sequentially illustrating a process of separating a display unit of the guide robot according to the third embodiment.
Figure 21:
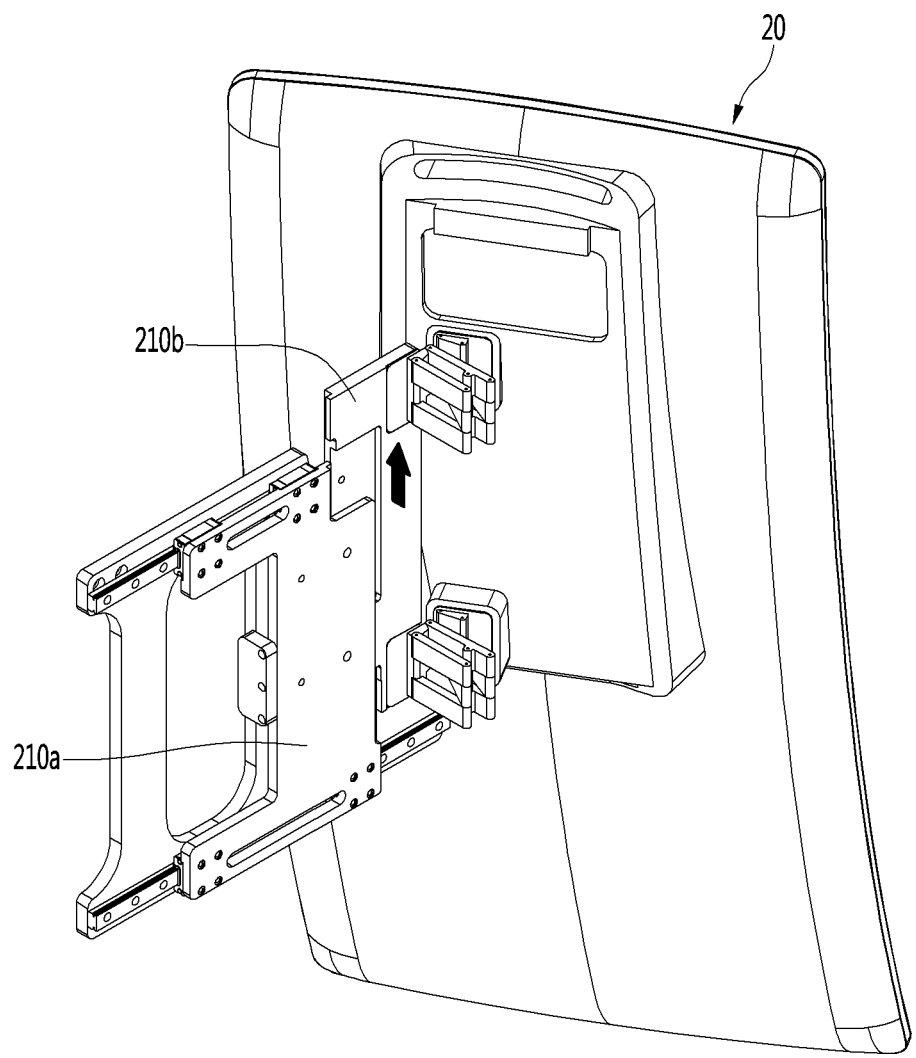
Figure 22:
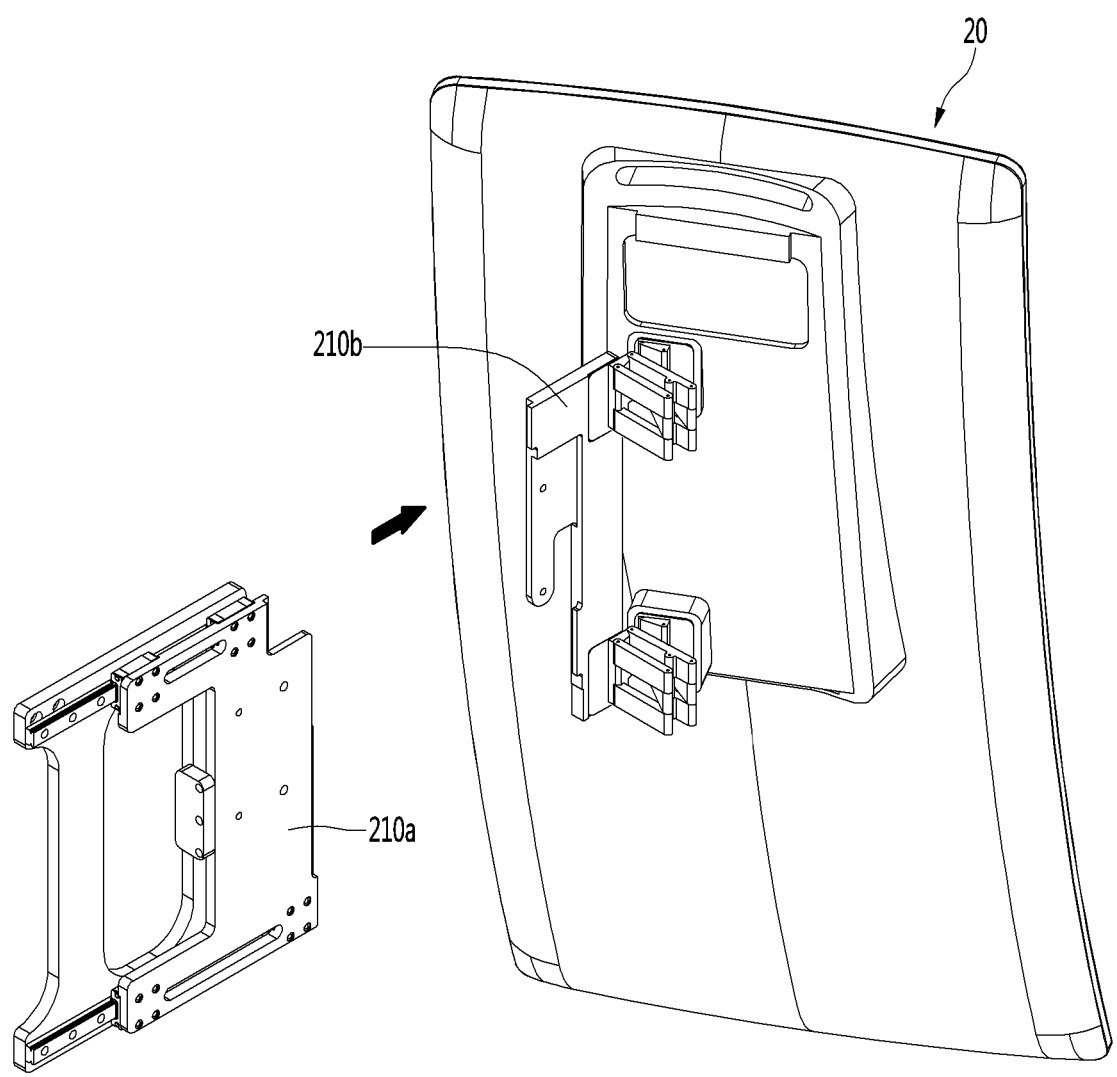

The process of separating the display unit 20 in the third embodiment will be described with reference to FIGS. 20 to 22. Like the first and second embodiments, the guide plates 210a and 210b may be slidably withdrawn backward, and the display unit 20 may rotate through the first and second coupling devices 240 and 250 to open the coupling hole 32b.

When the display unit 20 is maximally withdrawn, the stopper 270 may come into contact with the rear end of the hook hole 66 of the second installation plate 65a to prevent the display unit 20 from being further withdrawn. The worker may access the internal components through the coupling hole 32*b*. When it is difficult to perform the working through only the coupling hole 32*b* opened by the rotation of the display unit 20 such as a case in which a large component of the internal components is managed, or separate equipment for the management is required, it may be necessary to separate the display unit 20.

The worker may manually release the coupling of the fixing member 280 coupling the first guide plate 210*a* to the second guide plate 210*b*. Since the fixing member 280 is coupled, the restriction of the first and second guide plates 210*a* and 210*b* may be released, and the second guide plate 210*b* may be inserted into and seated on the first guide plate 210*a*.

When the worker lifts the display unit 20 upward, the second assembly part 277 may slidably move upward along the first assembly part 276. Also, the display unit 20, the first and second coupling devices 240 and 250, and the second guide plate 210*b* may be separated from the first guide plate 210*a*. The display unit 20 separated after the working is finished may be assembled in a reverse order of the above-described separation order to close the coupling hole 32*b* again.

The worker may easily disassemble or assemble the display unit 20 to improve work convenience.

Also, due to the easy separation of the display unit 20, the accessibility to the internal components through the coupling hole 32*b* may be more improved.

According to the embodiment, since the access to the body part in which the main electrical components are provided is easy, cleaning or replacement may be easy to improve the manageability of the guide robot.

According to the embodiment, since it is unnecessary to separately disassemble and transport the heavy display unit, the difficulty of repairing the guide robot may be reduced and simplified. Therefore, there is an effect that a time required for repairing the guide robot is shortened.

According to the embodiment, as the repair time of the guide robot is shortened, and the difficulty of the repair is reduced, the labor cost for the repair may be reduced, thereby reducing the repair costs.

According to the embodiment, since the manageability of the guide robot is improved, the life expectancy of the guide robot may increase, and the labor productivity and the efficiency may be improved.

According to the embodiment, since the display unit freely rotates without interfering with other components by the guide plate, which is slidably withdrawn, the link, and the joint, the guide robot may be easily managed to improve the convenience.

According to the embodiment, the coupling member connecting the display unit to the attachment plate of the coupling device may be separated to easily completely separate the display unit, and various display units may be easily coupled to the coupling device. That is, the display unit may be easily replaced. Thus, the guide robot according to the embodiment may have the advantages of expandability that is capable of continuously upgrading the components and flexibility to be easily coupled to various components.

According to the embodiment, the user's convenience may be improved in the place where the floating population is large through the guide robot.

According to the embodiment, since the display unit is easily separated or coupled, the accessibility to the internal components of the guide robot may be improved.

Embodiments provide a guide robot capable of solving a limitation in which access is not easy when repair is required because positions, at which main electrical components are provided, are covered in a structure of the guide robot to which a display unit is coupled.

Embodiments also provide a guide robot capable of solving inconvenience of separately transferring a heavy display when repair is required in the guide robot to which a display is coupled.

Embodiments also provide a guide robot capable of solving a structural limitation of a display unit, in which it is difficult to be rotatably installed to a main body due to an interference with the display unit that is inclinedly coupled along an inclined case.

Embodiments also provide a guide robot capable of solving a limitation in which separation or disassembly of a display unit is not easy in a structure of the guide robot to which a display is coupled.

A guide robot according to an embodiment may include a case having a coupling hole and a door type display structure that is capable of opening or closing the coupling hole. Thus, access to the body part in which main electrical components are provided may be easy.

The guide robot according to an embodiment may include an installation plate coupled to a main frame, a slide guide and a guide plate, which are coupled to the installation plate, and a plurality of link type coupling devices coupled to one side of the guide plate and connected to the display unit to open or close the coupling hole by rotating the display unit after the display unit slidably moves. Thus, when the guide robot is repaired, it is unnecessary to separately separate and transport the display unit.

The guide robot according to an embodiment may include a movement guide device on the body part, and the movement guide device may include a guide plate, a guide rail for slidably withdrawing the guide plate, and a coupling device coupled to the guide plate. Since a plurality of likes are rotatably connected to the coupling device, the display unit may be rotatably installed without interference between components. Also, a sufficient rotation angle of the display unit may be secured.

In the guide robot according to an embodiment, the plurality of links and a mounting part coupled to the display unit may be provided in the movement guide device coupled to the installation plate to easily completely separate the display unit by separating only the coupling member from the mounting part.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

This application relates to U.S. application Ser. No. 15/853,333, and U.S. application Ser. No. 15/853,587, both filed on Dec. 22, 2017, which are hereby incorporated by reference in their entirety. Further, one of ordinary skill in the art will recognize that features disclosed in these above-noted applications may be combined in any combination with features disclosed herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A guide robot comprising:
    a lower section having a motor and a plurality of wheels connected to the motor;
    a body section provided above the lower section and having at least one lidar and a movable guide that slidably moves forward and backward;
    a head section rotatably provided above the body section;
    a case covering the body section and having an opening so that an inside of the body section is accessible and allows the movable guide to move into or out of the body section; and
    a door connected to the moveable guide to open or close the opening,
    wherein the body section further includes an installation plate having a space which restricts a movement distance of the movable guide,
    wherein the movable guide comprises:
        a slide guide coupled to the installation plate;
        a slider allowing the slide guide to be inserted therein to slidably move; and
        a guide plate connected to the slider to be movable forward and backward, and
    wherein the guide plate comprises:
        a first guide plate coupled to the slider; and
        a second guide plate releasably connected to the first guide plate.

2. The guide robot according to claim 1, wherein the door comprises:
    a display;
    a display cover accommodating the display; and
    a display support protruding from the display cover to open or close the opening.

3. The guide robot according to claim 1, wherein the door is rotatably connected to the movable guide.

4. The guide robot according to claim 1, wherein the moveable guide further includes a stopper to contact a wall defining the space to restrict the movement distance.

5. The guide robot according to claim 1, wherein the second guide plate is connected to the door.

6. The guide robot according to claim 1, wherein a section of the second guide plate is inserted into a section of the first guide plate to connect the second guide plate to the first guide plate.

7. The guide robot according to claim 1, wherein the second guide plate is detachably seated on the first guide plate to connect the second guide plate to the first guide plate.

8. The guide robot according to claim 1, wherein the first guide plate includes:
    a cutout region provided at an upper end of the first guide plate and supporting the second guide plate; and
    a first assembly region that includes a recessed surface under the cutout part.

9. The guide robot according to claim 8, wherein the second guide plate includes a second assembly region having a surface corresponding to the recessed surface of the first assembly region included in the first guide plate, wherein the second assembly region contacts the first assembly region when the second guide plate is connected to the first guide plate.

10. The guide robot according to claim 1, further comprising at least one hinge provided on the movable guide and coupled to the door.

11. The guide robot according to claim 10, wherein the at least one hinge is coupled to the second guide plate.

12. The guide robot according to claim 10, wherein the at least one hinge includes:
a support plate coupled to the movable guide; and
a first link rotatably connected to the support plate.

13. The guide robot according to claim 12, wherein the at least one hinge further includes a second link rotatably connected to the first link.

14. The guide robot according to claim 13, wherein the at least one hinge further includes an attachment plate having one end connected to the second link and the other end coupled to the door.

15. The guide robot according to claim 14, wherein the at least one hinge further includes a third link rotatably connected to the support plate and spaced apart from the first link.

16. The guide robot according to claim 15, wherein the at least one hinge further includes a fourth link rotatably connected to the third link.

17. The guide robot according to claim 1, further comprising a fastener that is inserted through a first opening in the first guide plate and a second opening in the guide plate to couple together the first guide plate and the guide plate.

* * * * *